United States Patent
Ding et al.

(10) Patent No.: US 12,335,487 B2
(45) Date of Patent: Jun. 17, 2025

(54) MULTI-RATE OF COMPUTER VISION TASK NEURAL NETWORKS IN COMPRESSION DOMAIN

(71) Applicant: Tencent America LLC, Palo Alto, CA (US)

(72) Inventors: Ding Ding, Washington, DC (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 79 days.

(21) Appl. No.: 18/124,828

(22) Filed: Mar. 22, 2023

(65) Prior Publication Data

US 2023/0336738 A1    Oct. 19, 2023

Related U.S. Application Data

(60) Provisional application No. 63/331,168, filed on Apr. 14, 2022.

(51) Int. Cl.
*H04N 19/82*   (2014.01)
*G06N 3/0455*   (2023.01)
(Continued)

(52) U.S. Cl.
CPC ......... *H04N 19/147* (2014.11); *G06N 3/0455* (2023.01); *G06N 3/09* (2023.01); *H04N 19/44* (2014.11)

(58) Field of Classification Search
CPC ........ H04N 19/147; H04N 19/44; G06N 3/09; G06N 3/0455
See application file for complete search history.

(56) References Cited

U.S. PATENT DOCUMENTS

2020/0250003 A1*   8/2020   Yang ................. G06V 30/19173
2020/0280717 A1*   9/2020   Li ............................. G06N 3/08
(Continued)

FOREIGN PATENT DOCUMENTS

| WO | 2015/098713 A1 | 7/2015 |
| WO | 2021220008 A1 | 11/2021 |
| WO | 2022/035571 A1 | 2/2022 |

OTHER PUBLICATIONS

D. Minnen, J. Ballé, G. Toderici, "Joint Autoregressive and Hierarchical Priors for Learned Image Compression", Proceedings of the 32nd International Conference on Neural Information Processing Systems, Dec. 2018, pp. 1-22.

(Continued)

*Primary Examiner* — Patrick E Demosky
(74) *Attorney, Agent, or Firm* — ArentFox Schiff LLP

(57) ABSTRACT

In some examples, processing circuitry decodes, from a coded bitstream that carries a compressed image, an index that points a value in a set of values of a parameter. A value change of the parameter adjusts a compression rate of the compressed image. The compressed image is generated by a neural network based encoder based on the parameter. The processing circuitry inputs the value of the parameter into a multi-rate compression domain computer vision task decoder. The multi-rate compression domain computer vision task decoder includes one or more neural networks for performing a computer vision task from compressed images according to corresponding values of the parameter that are used for generating the compressed images. The multi-rate compression domain computer vision task decoder generates a computer vision task result according to the compressed image in the coded bitstream and the value of the parameter.

16 Claims, 12 Drawing Sheets

(51) Int. Cl.
*G06N 3/09* (2023.01)
*H04N 19/147* (2014.01)
*H04N 19/44* (2014.01)

(56) References Cited

U.S. PATENT DOCUMENTS

| | | | |
|---|---|---|---|
| 2020/0280730 A1* | 9/2020 | Wang | H04N 19/154 |
| 2022/0224914 A1* | 7/2022 | Anderson | G06N 3/045 |
| 2023/0154055 A1* | 5/2023 | Besenbruch et al. | |
| | | | H04N 19/126 |

OTHER PUBLICATIONS

D. Liu, Z. Chen, S. Liu, F. Wu, "Deep Learning-Based Technology in Responses to the Joint Call for Proposals on Video Compression with Capability beyond HEVC", IEEE Transactions on Circuits and Systems for Video Technology, 2019, pp. 1-14.

Y. Li, S. Liu, K. Kawamura, "Methodology and reporting template for neural network coding tool testing", ISO/IEC JTC1/SC29/WG11 JVET-M1006, pp. 1-4.

S. Liu, L. Wang, P. Wu, H. Yang, "JVET AHG report 9: Neural Networks in Video Coding (AHG9)", ISO/IEC JTC1/SC29/WG11 JVET-J0009, pp. 1-6.

Ballé J, Minnen D, Singh S, et al. Variational image compression with a scale hyperprior[J]. arXiv preprint arXiv:1802.01436, 2018, pp. 1-23.

International Search Report and Written Opinion issued Jun. 12, 2023 in Application No. PCT/US2023/016068, pp. 1-14.

Office Action received for Japanese Patent Application No. 2023-564403, mailed on Nov. 19, 2024, 12 pages (7 pages of English Translation and 5 pages of Original Document).

Torfason et al., "Towards Image Understanding from Deep Compression without Decoding", ICLR 2018 conference paper, Available on internet at: http://arxiv.org/abs/1803.06131, 2018, 17 pages.

* cited by examiner

FIG. 2
Main encoder network

Conv: 5x5 c192 s2
GDN
Conv: 5x5 c192 s2
GDN
Conv: 5x5 c192 s2
GDN
Conv: 5x5 c192 s2
GDN

FIG. 3
Main decoder network

DeConv: 5x5 c192 s2
IGDN
DeConv: 5x5 c192 s2
IGDN
DeConv: 5x5 c192 s2
IGDN
DeConv: 5x5 c3 s2
IGDN

FIG. 4
Hyper encoder network

Conv: 3x3 c192 s1
Leaky ReLU
Conv: 5x5 c192 s2
Leaky ReLU
Conv: 5x5 c192 s2

FIG. 5
Hyper decoder network

DeConv: 5x5 c192 s2
Leaky ReLU
DeConv: 5x5 c288 s2
Leaky ReLU
DeConv: 3x3 c384 s1

FIG. 6
Context model NN

Masked: 5x5 c384 s1

FIG. 7
Entropy parameter NN

Conv: 1x1 c640 s1
Leaky ReLU
Conv: 1x1 c512 s1
Leaky ReLU
Conv: 1x1 c384 s1

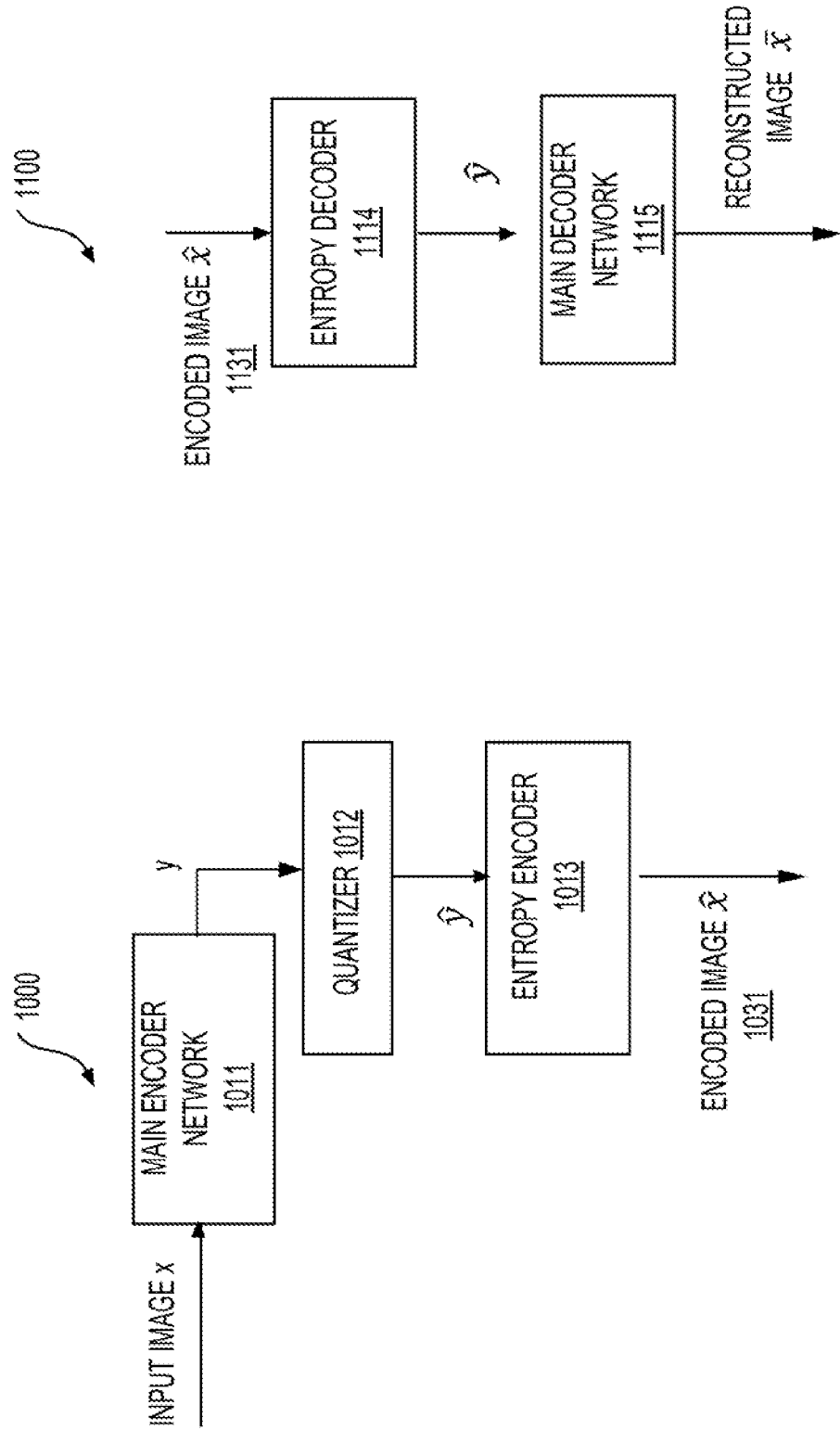

MULTI-RATE OF COMPUTER VISION TASK NEURAL NETWORKS IN COMPRESSION DOMAIN

INCORPORATION BY REFERENCE

This present disclosure claims the benefit of priority to U.S. Provisional Application No. 63/331,168, "Multi-rate of Computer Vision Task Neural Networks in Compression Domain" filed on Apr. 14, 2022, which is incorporated by reference herein in its entirety.

TECHNICAL FIELD

The present disclosure describes embodiments generally related to image/video processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. Improving image/video compression tools can require a lot of expertise, efforts and time. Machine learning techniques can be applied in the image/video compression to simply and accelerate the improvement of compression tools.

SUMMARY

Aspects of the disclosure provide methods and apparatuses for image/video processing (e.g., encoding and decoding). In some examples, an apparatus for image/video processing includes processing circuitry. The processing circuitry decodes, from a coded bitstream that carries a compressed image, an index that points a value in a set of values of a parameter. A value change of the parameter adjusts a compression rate of the compressed image. The compressed image is generated by a neural network based encoder based on the parameter. The processing circuitry inputs the value of the parameter into a multi-rate compression domain computer vision task decoder in a compression domain computer vision task framework (CDCVTF). The multi-rate compression domain computer vision task decoder includes one or more neural networks for performing a computer vision task from compressed images according to corresponding values of the parameter that are used for generating the compressed images at multiple different compression rates. The multi-rate compression domain computer vision task decoder generates a computer vision task result according to the compressed image in the coded bitstream which is compressed at a corresponding compression rate from the multiple different compression rates based on the value of the parameter.

In some examples, a first neural network in the multi-rate compression domain computer vision task decoder converts the value of the parameter to a tensor. The tensor is input to one or more layers in a second neural network in the multi-rate compression domain computer vision task decoder. The second neural network generates the computer vision task result according to the compressed image and the tensor.

In some examples, the first neural network includes one or more convolution layers.

In some examples, the first neural network includes a convolution layer with an activation function.

In some examples, the second neural network is configured to generate the computer vision task result without generating a reconstructed image from the compressed image.

In some examples, the second neural network is configured to generate a reconstructed image from the compressed image, and generate the computer vision task result from the reconstructed image.

In some examples, the neural network based encoder is based on an encoder model in a neural image compression (NIC) framework, and the multi-rate compression domain computer vision task decoder is based on a decoder model in the NIC framework, the NIC framework is trained end-to-end.

In some examples, a decoder model of the multi-rate compression domain computer vision task decoder is trained separate from an encoder model of the neural network based encoder.

In some examples, the parameter is a hyperparameter for weighting a distortion in a calculation of a rate distortion loss.

In some examples, the computer vision task includes at least one of image classification, image denoising, object detection and super resolution.

Aspects of the disclosure also provide a non-transitory computer-readable storage medium storing a program executable by at least one processor to perform the methods for image/video encoding and/or decoding.

BRIEF DESCRIPTION OF THE DRAWINGS

Further features, the nature, and various advantages of the disclosed subject matter will be more apparent from the following detailed description and the accompanying drawings in which:

FIG. 2 shows an example of a main encoder network in some examples.

FIG. 3 shows an example of a main decoder network in some examples.

FIG. 4 shows an example of a hyper encoder network in some examples.

FIG. 5 shows an example of a hyper decoder network in some examples.

FIG. 6 shows an example of a context model neural network in some examples.

FIG. 7 shows an example of an entropy parameter neural network in some examples.

FIGS. 10-11 show an image encoder and a corresponding image decoder in some examples.

DETAILED DESCRIPTION OF EMBODIMENTS

Figure 1:
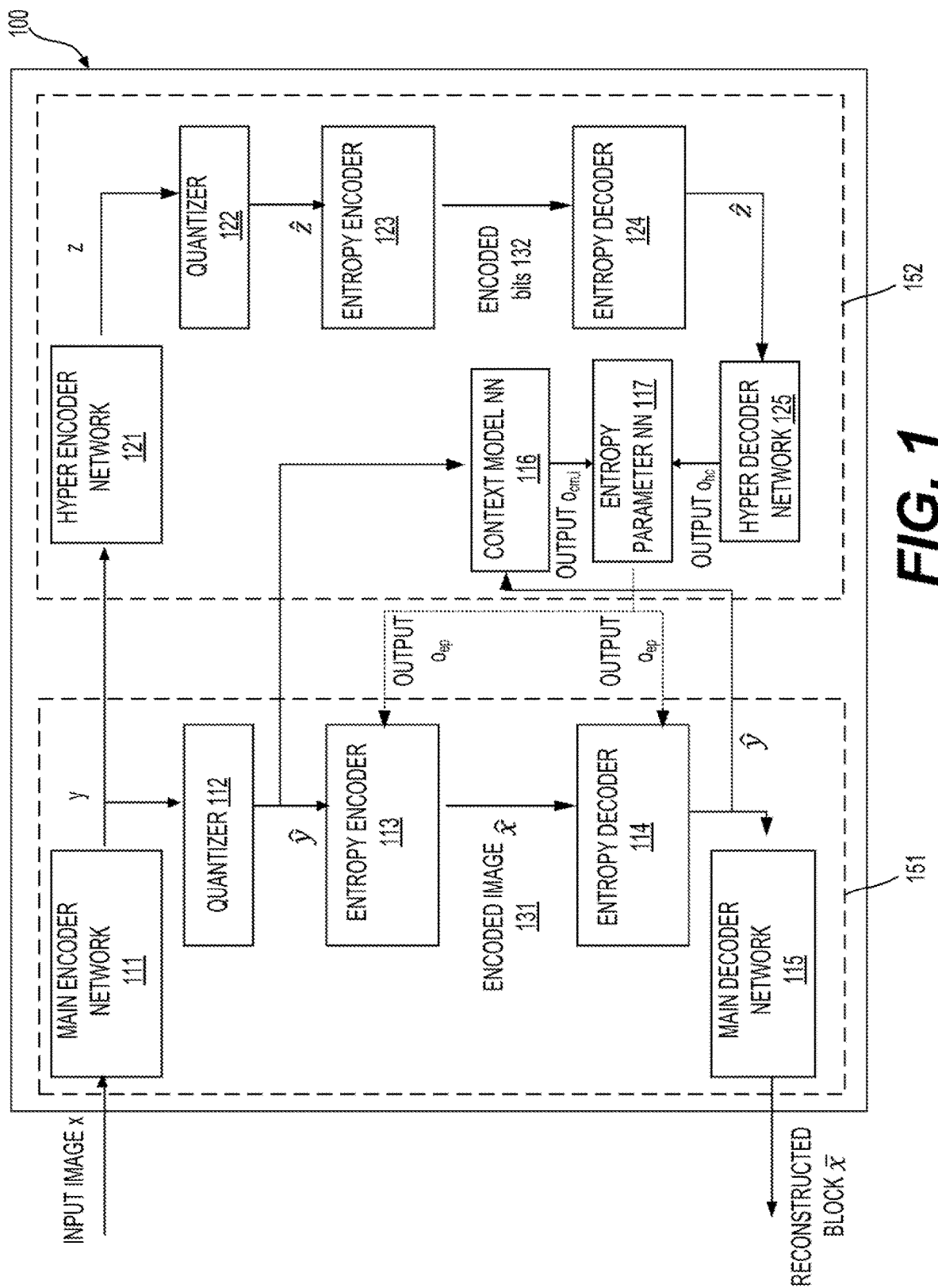
FIG. 1 shows a neural image compression (NIC) framework in some examples.

According to an aspect of the disclosure, some video codecs can be difficult to be optimized as a whole. For example, an improvement of a single module (e.g., an encoder) in the video codec may not result in a coding gain in the overall performance. In contrast, in an artificial neural network (ANN) based video/image coding framework, a machine learning process can be performed, then different modules of the ANN based video/image coding framework can be jointly optimized from input to output to improve a final objective (e.g., rate-distortion performance, such as a rate-distortion loss L described in the disclosure). For example, a learning process or a training process (e.g., a machine learning process) can be performed on an ANN based video/image coding framework to optimize modules of the ANN based video/image coding framework jointly to achieve an overall optimized rate-distortion performance, and thus the optimization result can be an end to end (E2E) optimized neural image compression (NIC).

In the following description, the ANN based video/image coding framework is illustrated by a neural image compression (NIC) framework. While image compression (e.g., encoding and decoding) is illustrated in the following description, it is noted that the techniques for image compression can be suitably applied for video compression.

According to some aspects of the disclosure, an NIC framework can be trained in an offline training process and/or an online training process. In the offline training process, a set of training images that are collected previously can be used to train the NIC framework to optimize the NIC framework. In some examples, the determined parameters of the NIC framework by the offline training process can be referred to as pretrained parameters, and the NIC framework with the pretrained parameters can be referred to as pretrained NIC framework. The pretrained NIC framework can be used for image compression operations.

In some examples, when one or more images (also referred to as one or more target images) are available for an image compression operation, the pretrained NIC framework is further trained based on the one or more target images in an online training process to tune parameters of the NIC framework. The tuned parameters of the NIC framework by the online training process can be referred to as online trained parameters, and the NIC framework with the online trained parameters can be referred to as online trained NIC framework. The online trained NIC framework can then perform the image compression operation on the one or more target images. Some aspects of the disclosure provide techniques for online training based encoder tuning in neural image compression.

A neural network refers to a computational architecture that models a biological brain. The neural network can be a model implemented in software or hardware that emulates computing power of a biological system by using a large number of artificial neurons connected via connection lines. The artificial neurons referred to as nodes are connected to each other and operate collectively to process input data. A neural network (NN) is also known as artificial neural network (ANN).

Nodes in an ANN can be organized in any suitable architecture. In some embodiments, nodes in an ANN are organized in layers including an input layer that receives input signal(s) to the ANN and an output layer that outputs output signal(s) from the ANN. In an embodiment, the ANN further includes layer(s) that may be referred to as hidden layer(s) between the input layer and the output layer. Different layers may perform different kinds of transformations on respective inputs of the different layers. Signals can travel from the input layer to the output layer.

An ANN with multiple layers between an input layer and an output layer can be referred to as a deep neural network (DNN). DNN can have any suitable structures. In some examples, a DNN is configured in a feedforward network structure where data flows from the input layer to the output layer without looping back. In some examples, a DNN is configured in a fully connected network structure where each node in one layer is connected to all nodes in the next layer. In some examples, a DNN is configured in a recurrent neural network (RNN) structure where data can flow in any direction.

An ANN with at least a convolution layer that performs convolution operation can be referred to as a convolution neural network (CNN). A CNN can include an input layer, an output layer, and hidden layer(s) between the input layer and the output layer. The hidden layer(s) can include convolutional layer(s) (e.g., used in an encoder) that perform convolutions, such as a two-dimensional (2D) convolution. In an embodiment, a 2D convolution performed in a convolution layer is between a convolution kernel (also referred to as a filter or channel, such as a 5×5 matrix) and an input signal (e.g., a 2D matrix such as a 2D block, a 256×256 matrix) to the convolution layer. The dimension of the convolution kernel (e.g., 5×5) is smaller than the dimension of the input signal (e.g., 256×256). During a convolution operation, dot product operations are performed on the convolution kernel and patches (e.g., 5×5 areas) in the input signal (e.g., a 256×256 matrix) of the same size as the convolution kernel to generate output signals for inputting to the next layer. A patch (e.g., a 5×5 area) in the input signal (e.g., a 256×256 matrix) that is of the size of the convolution kernel can be referred to as a receptive field for a respective node in the next layer.

During the convolution, a dot product of the convolution kernel and the corresponding receptive field in the input signal is calculated. The convolution kernel includes weights as elements, each element of the convolution kernel is a weight that is applied to a corresponding sample in the receptive field. For example, a convolution kernel represented by a 5×5 matrix has 25 weights. In some examples, a bias is applied to the output signal of the convolution layer, and the output signal is based on a sum of the dot product and the bias.

In some examples, the convolution kernel can shift along the input signal (e.g., a 2D matrix) by a size referred to as a stride, and thus the convolution operation generates a feature map or an activation map (e.g., another 2D matrix), which in turn contributes to an input of the next layer in the CNN. For example, the input signal is a 2D block having 256×256 samples, a stride is 2 samples (e.g., a stride of 2). For the stride of 2, the convolution kernel shifts along an X direction (e.g., a horizontal direction) and/or a Y direction (e.g., a vertical direction) by 2 samples.

In some examples, multiple convolution kernels can be applied in the same convolution layer to the input signal to generate multiple feature maps, respectively, where each feature map can represent a specific feature of the input signal. In some examples, a convolution kernel can correspond to a feature map. A convolution layer with N convolution kernels (or N channels), each convolution kernel having M×M samples, and a stride S can be specified as Conv: M×M cN sS. For example, a convolution layer with 192 convolution kernels (or 192 channels), each convolution kernel having 5×5 samples, and a stride of 2 is specified as Conv: 5×5 c192 s2. The hidden layer(s) can include deconvolutional layer(s) (e.g., used in a decoder) that perform deconvolutions, such as a 2D deconvolution. A deconvolution is an inverse of a convolution. A deconvolution layer with 192 deconvolution kernels (or 192 channels), each deconvolution kernel having 5×5 samples, and a stride of 2 is specified as DeConv: 5×5 c192 s2.

In a CNN, a relatively large number of nodes can share a same filter (e.g., same weights) and a same bias (if the bias is used), and thus a memory footprint can be reduced because a single bias and a single vector of weights can be used across all receptive fields that share the same filter. For example, for an input signal having 100×100 samples, a convolution layer with a convolution kernel having 5×5 samples has 25 learnable parameters (e.g., weights). If a bias is used, then one channel uses 26 learnable parameters (e.g., 25 weights and one bias). If the convolution layer has N convolution kernels, the total learnable parameters is 26×N. The number of learnable parameters is relatively small compared to a fully connected feedforward neural network layer. For example, for a fully connected feedforward layer, 100×100 (i.e., 10000) weights are used to generate a result signal for inputting to each node in the next layer. If the next layer has L nodes, then the total learnable parameters is 10000×L.

A CNN can further include one or more other layer(s), such as pooling layer(s), fully connected layer(s) that can connect every node in one layer to every node in another layer, normalization layer(s), and/or the like. Layers in a CNN can be arranged in any suitable order and in any suitable architecture (e.g., a feed-forward architecture, a recurrent architecture). In an example, a convolutional layer is followed by other layer(s), such as pooling layer(s), fully connected layer(s), normalization layer(s), and/or the like.

A pooling layer can be used to reduce dimensions of data by combining outputs from a plurality of nodes at one layer into a single node in the next layer. A pooling operation for a pooling layer having a feature map as an input is described below. The description can be suitably adapted to other input signals. The feature map can be divided into sub-regions (e.g., rectangular sub-regions), and features in the respective sub-regions can be independently down-sampled (or pooled) to a single value, for example, by taking an average value in an average pooling or a maximum value in a max pooling.

The pooling layer can perform a pooling, such as a local pooling, a global pooling, a max pooling, an average pooling, and/or the like. A pooling is a form of nonlinear down-sampling. A local pooling combines a small number of nodes (e.g., a local cluster of nodes, such as 2×2 nodes) in the feature map. A global pooling can combine all nodes, for example, of the feature map.

The pooling layer can reduce a size of the representation, and thus reduce a number of parameters, a memory footprint, and an amount of computation in a CNN. In an example, a pooling layer is inserted between successive convolutional layers in a CNN. In an example, a pooling layer is followed by an activation function, such as a rectified linear unit (ReLU) layer. In an example, a pooling layer is omitted between successive convolutional layers in a CNN.

A normalization layer can be an ReLU, a leaky ReLU, a generalized divisive normalization (GDN), an inverse GDN (IGDN), or the like. An ReLU can apply a non-saturating activation function to remove negative values from an input signal, such as a feature map, by setting the negative values to zero. A leaky ReLU can have a small slope (e.g., 0.01) for negative values instead of a flat slope (e.g., 0). Accordingly, if a value x is larger than 0, then an output from the leaky ReLU is x. Otherwise, the output from the leaky ReLU is the value x multiplied by the small slope (e.g., 0.01). In an example, the slope is determined before training, and thus is not learnt during training.

An NIC framework can correspond to a compression model for image compression. The NIC framework receives an input image x and outputs a reconstructed image $\bar{x}$ corresponding to the input image x. The NIC framework can include a neural network encoder (e.g., an encoder based on neural networks such as DNNs) and a neural network decoder (e.g., a decoder based on neural networks such as DNNs). The input image x is provided as an input to the neural network encoder to compute a compressed representation (e.g., a compact representation) $\hat{x}$ that can be compact, for example, for storage and transmission purposes. The compressed representation $\hat{x}$ is provided as an input to the neural network decoder to generate the reconstructed image $\bar{x}$. In various embodiments, the input image x and reconstructed image $\bar{x}$ are in a spatial domain and the compressed representation $\hat{x}$ is in a domain different from the spatial domain. In some examples, the compressed representation $\hat{x}$ is quantized and entropy coded.

In some examples, an NIC framework can use a variational autoencoder (VAE) structure. In the VAE structure, the entire input image x can be input to the neural network encoder. The entire input image x can pass through a set of neural network layers (of the neural network encoder) that work as a black box to compute the compressed representation $\hat{x}$. The compressed representation $\hat{x}$ is an output of the neural network encoder. The neural network decoder can take the entire compressed representation $\hat{x}$ as an input. The compressed representation $\hat{x}$ can pass through another set of neural network layers (of the neural network decoder) that work as another black box to compute the reconstructed image $\bar{x}$. A rate-distortion (R-D) loss L (x, $\bar{x}$, $\hat{x}$) can be optimized to achieve a trade-off between a distortion loss D (x, $\bar{x}$) of the reconstructed image $\bar{x}$ and bit consumption R of the compact representation $\hat{x}$ with a trade-off hyperparameter λ, such as according to Eq. 1:

$$L(x,\bar{x},\hat{x})=\lambda D(x,\bar{x})+R(\hat{x}) \qquad \text{Eq. 1}$$

A neural network (e.g., an ANN) can learn to perform tasks from examples, without task-specific programming. An ANN can be configured with connected nodes or artificial neurons. A connection between nodes can transmit a signal from a first node to a second node (e.g., a receiving node), and the signal can be modified by a weight which can be indicated by a weight coefficient for the connection. The receiving node can process signal(s) (i.e., input signal(s) for the receiving node) from node(s) that transmit the signal(s) to the receiving node and then generate an output signal by applying a function to the input signals. The function can be a linear function. In an example, the output signal is a weighted summation of the input signal(s). In an example, the output signal is further modified by a bias which can be indicated by a bias term, and thus the output signal is a sum of the bias and the weighted summation of the input signal(s). The function can include a nonlinear operation, for example, on the weighted sum or the sum of the bias and the weighted summation of the input signal(s). The output signal can be sent to node(s) (downstream node(s)) connected to the receiving node). The ANN can be represented or configured by parameters (e.g., weights of the connections and/or biases). The weights and/or the biases can be obtained by training (e.g., offline training, online training, and the like) the ANN with examples where the weights and/or the biases can be iteratively adjusted. The trained ANN configured with the determined weights and/or the determined biases can be used to perform tasks.

FIG. 1 shows an NIC framework (100) (e.g., a NIC system) in some examples. The NIC framework (100) can be based on neural networks, such as DNNs and/or CNNs. The NIC framework (100) can be used to compress (e.g., encode) images and decompress (e.g., decode or reconstruct) compressed images (e.g., encoded images).

Specifically, in the FIG. 1 example, the compression model in the NIC framework (100) includes two levels that are referred to as a main level of the compression model and a hyper level of the compression model. The main level of the compression model and the hyper level of the compression model can be implemented using neural networks. The neural networks for the main level of the compression model is shown as a first sub-NN (151) and the hyper level of the compression model is shown as a second sub-NN (152) in FIG. 1.

The first sub-NN (151) can resemble an autoencoder and can be trained to generate a compressed image $\hat{x}$ of an input image x and decompress the compressed image (i.e., the encoded image) $\hat{x}$ to obtain a reconstructed image $\bar{x}$. The first sub-NN (151) can include a plurality of components (or modules), such as a main encoder neural network (or a main encoder network) (111), a quantizer (112), an entropy encoder (113), an entropy decoder (114), and a main decoder neural network (or a main encoder network) (115).

Referring to FIG. 1, the main encoder network (111) can generate a latent or a latent representation y from the input image x (e.g., an image to be compressed or encoded). In an example, the main encoder network (111) is implemented using a CNN. A relationship between the latent representation y and the input image x can be described using Eq. 2:

$$y = f_1(x; \theta_1) \qquad \text{Eq. 2}$$

where a parameter $\theta_1$ represents parameters, such as weights used in convolution kernels in the main encoder network (111) and biases (if biases are used in the main encoder network (111)).

The latent representation y can be quantized using the quantizer (112) to generate a quantized latent $\hat{y}$. The quantized latent $\hat{y}$ can be compressed, for example, using lossless compression by the entropy encoder (113) to generate the compressed image (e.g., an encoded image) $\hat{x}$ (131) that is a compressed representation $\hat{x}$ of the input image x. The entropy encoder (113) can use entropy coding techniques such as Huffman coding, arithmetic coding, or the like. In an example, the entropy encoder (113) uses arithmetic encoding and is an arithmetic encoder. In an example, the encoded image (131) is transmitted in a coded bitstream.

The encoded image (131) can be decompressed (e.g., entropy decoded) by the entropy decoder (114) to generate an output. The entropy decoder (114) can use entropy coding techniques such as Huffman coding, arithmetic coding, or the like that correspond to the entropy encoding techniques used in the entropy encoder (113). In an example, the entropy decoder (114) uses arithmetic decoding and is an arithmetic decoder. In an example, lossless compression is used in the entropy encoder (113), lossless decompression is used in the entropy decoder (114), and noises, such as due to the transmission of the encoded image (131) are omissible, the output from the entropy decoder (114) is the quantized latent $\hat{y}$.

The main decoder network (115) can decode the quantized latent $\hat{y}$ to generate the reconstructed image $\bar{x}$. In an example, the main decoder network (115) is implemented using a CNN. A relationship between the reconstructed image $\bar{x}$ (i.e., the output of the main decoder network (115)) and the quantized latent $\hat{y}$ (i.e., the input of the main decoder network (115)) can be described using Eq. 3:

$$\bar{x} = f_2(\hat{y}; \theta_2) \qquad \text{Eq. 3}$$

where a parameter $\theta_2$ represents parameters, such as weights used in convolution kernels in the main decoder network (115) and biases (if biases are used in the main decoder network (115)). Thus, the first sub-NN (151) can compress (e.g., encode) the input image x to obtain the encoded image (131) and decompress (e.g., decode) the encoded image (131) to obtain the reconstructed image $\bar{x}$. The reconstructed image $\bar{x}$ can be different from the input image x due to quantization loss introduced by the quantizer (112).

In some examples, the second sub-NN (152) can learn the entropy model (e.g., a prior probabilistic model) over the quantized latent $\hat{y}$ used for entropy coding. Thus, the entropy model can be a conditioned entropy model, e.g., a Gaussian mixture model (GMM), a Gaussian scale model (GSM) that is dependent on the input image x.

In some examples, the second sub-NN (152) can include a context model NN (116), an entropy parameter NN (117), a hyper encoder network (121), a quantizer (122), an entropy encoder (123), an entropy decoder (124), and a hyper decoder network (125). The entropy model used in the context model NN (116) can be an autoregressive model over latent (e.g., the quantized latent $\hat{y}$). In an example, the hyper encoder network (121), the quantizer (122), the entropy encoder (123), the entropy decoder (124), and the hyper decoder network (125) form a hyperprior model that can be implemented using neural networks in the hyper level (e.g., a hyperprior NN). The hyperprior model can represent information useful for correcting context-based predictions. Data from the context model NN (116) and the hyperprior model can be combined by the entropy parameter NN (117). The entropy parameter NN (117) can generate parameters, such as mean and scale parameters for the entropy model such as a conditional Gaussian entropy model (e.g., the GMM).

Referring to FIG. 1, at an encoder side, the quantized latent $\hat{y}$ from the quantizer (112) is fed into the context model NN (116). At a decoder side, the quantized latent $\hat{y}$ from the entropy decoder (114) is fed into the context model NN (116). The context model NN (116) can be implemented using a neural network, such as a CNN. The context model NN (116) can generate an output $o_{cm,i}$ based on a context $\hat{y}_{<i}$ that is the quantized latent $\hat{y}$ available to the context model NN (116). The context $\hat{y}_{<i}$ can include previously quantized latent at the encoder side or previously entropy decoded quantized latent at the decoder side. A relationship between the output $o_{cm,i}$ and the input (e.g., $\hat{y}_{<i}$) of the context model NN (116) can be described using Eq. 4:

$$o_{cm,i} = f_3(\hat{y}_{<i}; \theta_3) \qquad \text{Eq. 4}$$

where a parameter $\theta_3$ represents parameters, such as weights used in convolution kernels in the context model NN (116) and biases (if biases are used in the context model NN (116)).

The output $o_{cm,i}$ from the context model NN (116) and an output $o_{hc}$ from the hyper decoder network (125) are fed into the entropy parameter NN (117) to generate an output $o_{ep}$. The entropy parameter NN (117) can be implemented using a neural network, such as a CNN. A relationship between the output $o_{ep}$ and the inputs (e.g., $o_{cm,i}$ and $o_{hc}$) of the entropy parameter NN (117) can be described using Eq. 5:

$$o_{ep} = f_4(o_{cm,i}, o_{hc}; \theta_4) \qquad \text{Eq. 5}$$

where a parameter $\theta_4$ represents parameters, such as weights used in convolution kernels in the entropy parameter NN (117) and biases (if biases are used in the entropy parameter NN (117)). The output $o_{ep}$ of the entropy parameter NN (117) can be used in determining (e.g., conditioning) the entropy model, and thus the conditioned entropy model can be dependent on the input image x, for example, via the output $o_{hc}$ from the hyper decoder network (125). In an example, the output $o_{ep}$ includes parameters, such as the mean and scale parameters, used to condition the entropy model (e.g., GMM). Referring to FIG. 1, the entropy model (e.g., the conditioned entropy model) can be employed by the entropy encoder (113) and the entropy decoder (114) in entropy coding and entropy decoding, respectively.

The second sub-NN (152) can be described below. The latent y can be fed into the hyper encoder network (121) to generate a hyper latent z. In an example, the hyper encoder network (121) is implemented using a neural network, such as a CNN. A relationship between the hyper latent z and the latent y can be described using Eq. 6.

$$z = f_5(y; \theta_5) \qquad \text{Eq. 6}$$

where a parameter $\theta_5$ represents parameters, such as weights used in convolution kernels in the hyper encoder network (121) and biases (if biases are used in the hyper encoder network (121)).

The hyper latent z is quantized by the quantizer (122) to generate a quantized latent $\hat{z}$. The quantized latent $\hat{z}$ can be compressed, for example, using lossless compression by the entropy encoder (123) to generate side information, such as encoded bits (132) from the hyper neural network. The entropy encoder (123) can use entropy coding techniques such as Huffman coding, arithmetic coding, or the like. In an example, the entropy encoder (123) uses arithmetic encoding and is an arithmetic encoder. In an example, the side information, such as the encoded bits (132), can be transmitted in the coded bitstream, for example, together with the encoded image (131).

The side information, such as the encoded bits (132), can be decompressed (e.g., entropy decoded) by the entropy decoder (124) to generate an output. The entropy decoder (124) can use entropy coding techniques such as Huffman coding, arithmetic coding, or the like. In an example, the entropy decoder (124) uses arithmetic decoding and is an arithmetic decoder. In an example, lossless compression is used in the entropy encoder (123), lossless decompression is used in the entropy decoder (124), and noises, such as due to the transmission of the side information are omissible, the output from the entropy decoder (124) can be the quantized latent $\hat{z}$. The hyper decoder network (125) can decode the quantized latent $\hat{z}$ to generate the output $o_{hc}$. A relationship between the output $o_{hc}$ and the quantized latent $\hat{z}$ can be described using Eq. 7.

$$o_{hc} = f_6(\hat{z}; \theta_6) \qquad \text{Eq. 7}$$

where a parameter $\theta_6$ represents parameters, such as weights used in convolution kernels in the hyper decoder network (125) and biases (if biases are used in the hyper decoder network (125)).

As described above, the compressed or encoded bits (132) can be added to the coded bitstream as the side information, which enables the entropy decoder (114) to use the conditional entropy model. Thus, the entropy model can be image-dependent and spatially adaptive, and thus can be more accurate than a fixed entropy model.

The NIC framework (100) can be suitably adapted, for example, to omit one or more components shown in FIG. 1, to modify one or more components shown in FIG. 1, and/or to include one or more components not shown in FIG. 1. In an example, a NIC framework using a fixed entropy model includes the first sub-NN (151), and does not include the second sub-NN (152). In an example, a NIC framework includes the components in the NIC framework (100) except the entropy encoder (123) and the entropy decoder (124).

In an embodiment, one or more components in the NIC framework (100) shown in FIG. 1 are implemented using neural network(s), such as CNN(s). Each NN-based component (e.g., the main encoder network (111), the main decoder network (115), the context model NN (116), the entropy parameter NN (117), the hyper encoder network (121), or the hyper decoder network (125)) in a NIC framework (e.g., the NIC framework (100)) can include any suitable architecture (e.g., have any suitable combinations of layers), include any suitable types of parameters (e.g., weights, biases, a combination of weights and biases, and/or the like), and include any suitable number of parameters.

In an embodiment, the main encoder network (111), the main decoder network (115), the context model NN (116), the entropy parameter NN (117), the hyper encoder network (121), and the hyper decoder network (125) are implemented using respective CNNs.

FIG. 2 shows an exemplary CNN for the main encoder network (111) according to an embodiment of the disclosure. For example, the main encoder network (111) includes four sets of layers where each set of layers includes a convolution layer 5×5 c192 s2 followed by a GDN layer. One or more layers shown in FIG. 2 can be modified and/or omitted. Additional layer(s) can be added to the main encoder network (111).

FIG. 3 shows an exemplary CNN for the main decoder network (115) according to an embodiment of the disclosure. For example, the main decoder network (115) includes three sets of layers where each set of layers includes a deconvolution layer 5×5 c192 s2 followed by an IGDN layer. In addition, the three sets of layers are followed by a deconvolution layer 5×5 c3 s2 followed by an IGDN layer. One or more layers shown in FIG. 3 can be modified and/or omitted. Additional layer(s) can be added to the main decoder network (115).

FIG. 4 shows an exemplary CNN for the hyper encoder network (121) according to an embodiment of the disclosure. For example, the hyper encoder network (121) includes a convolution layer 3×3 c192 s1 followed by a leaky ReLU, a convolution layer 5×5 c192 s2 followed by a leaky ReLU, and a convolution layer 5×5 c192 s2. One or more layers shown in FIG. 4 can be modified and/or omitted. Additional layer(s) can be added to the hyper encoder network (121).

FIG. 5 shows an exemplary CNN for the hyper decoder network (125) according to an embodiment of the disclosure. For example, the hyper decoder network (125) includes a deconvolution layer 5×5 c192 s2 followed by a leaky ReLU, a deconvolution layer 5×5 c288 s2 followed by a leaky ReLU, and a deconvolution layer 3×3 c384 s1. One or more layers shown in FIG. 5 can be modified and/or omitted. Additional layer(s) can be added to the hyper decoder network (125).

FIG. 6 shows an exemplary CNN for the context model NN (116) according to an embodiment of the disclosure. For example, the context model NN (116) includes a masked convolution 5×5 c384 s1 for context prediction, and thus the context $\hat{y}_{<i}$ in Eq. 4 includes a limited context (e.g., a 5×5 convolution kernel). The convolution layer in FIG. 6 can be modified. Additional layer(s) can be added to the context model NN (1016).

FIG. 7 shows an exemplary CNN for the entropy parameter NN (117) according to an embodiment of the disclosure. For example, the entropy parameter NN (117) includes a convolution layer 1×1 c640 s1 followed by a leaky ReLU, a convolution layer 1×1 c512 s1 followed by leaky ReLU, and a convolution layer 1×1 c384 s1. One or more layers shown in FIG. 7 can be modified and/or omitted. Additional layer(s) can be added to the entropy parameter NN (117).

The NIC framework (100) can be implemented using CNNs, as described with reference to FIGS. 2-7. The NIC framework (100) can be suitably adapted such that one or more components (e.g., (111), (115), (116), (117), (121), and/or (125)) in the NIC framework (100) are implemented using any suitable types of neural networks (e.g., CNNs or non-CNN based neural networks). One or more other components the NIC framework (100) can be implemented using neural network(s).

The NIC framework (100) that includes neural networks (e.g., CNNs) can be trained to learn the parameters used in the neural networks. For example, when CNNs are used, the parameters represented by $\theta_1$-$\theta_6$, such as the weights used in the convolution kernels in the main encoder network (111) and biases (if biases are used in the main encoder network (111)), the weights used in the convolution kernels in the main decoder network (115) and biases (if biases are used in the main decoder network (115)), the weights used in the convolution kernels in the hyper encoder network (121) and biases (if biases are used in the hyper encoder network (121)), the weights used in the convolution kernels in the hyper decoder network (125) and biases (if biases are used in the hyper decoder network (125)), the weights used in the convolution kernel(s) in the context model NN (116) and biases (if biases are used in the context model NN (116)), and the weights used in the convolution kernels in the entropy parameter NN (117) and biases (if biases are used in the entropy parameter NN (117)), respectively, can be learned in the training process (e.g. offline training process, online training process, and the like).

In an example, referring to FIG. 2, the main encoder network (111) includes four convolution layers where each convolution layer has a convolution kernel of 5×5 and 192 channels. Thus, a number of the weights used in the convolution kernels in the main encoder network (111) is 19200 (i.e., 4×5×5×192). The parameters used in the main encoder network (111) include the 19200 weights and optional biases. Additional parameter(s) can be included when biases and/or additional NN(s) are used in the main encoder network (111).

Referring to FIG. 1, the NIC framework (100) includes at least one component or module built on neural network(s). The at least one component can include one or more of the main encoder network (111), the main decoder network (115), the hyper encoder network (121), the hyper decoder network (125), the context model NN (116), and the entropy parameter NN (117). The at least one component can be trained individually. In an example, the training process is used to learn the parameters for each component separately. The at least one component can be trained jointly as a group. In an example, the training process is used to learn the parameters for a subset of the at least one component jointly. In an example, the training process is used to learn the parameters for all of the at least one component, and thus is referred to as an E2E optimization.

In the training process for one or more components in the NIC framework (100), the weights (or the weight coefficients) of the one or more components can be initialized. In an example, the weights are initialized based on pre-trained corresponding neural network model(s) (e.g., DNN models, CNN models). In an example, the weights are initialized by setting the weights to random numbers.

A set of training images can be employed to train the one or more components, for example, after the weights are initialized. The set of training images can include any suitable images having any suitable size(s). In some examples, the set of training images includes images from raw images, natural images, computer-generated images, and/or the like that are in the spatial domain. In some examples, the set of training images includes images from residue images or residue images having residue data in the spatial domain. The residue data can be calculated by a residue calculator. In some examples, raw images and/or residue images including residue data can be used directly to train neural networks in a NIC framework, such as the NIC framework (100). Thus, raw images, residue images, images from raw images, and/or images from residue images can be used to train neural networks in a NIC framework.

For purposes of brevity, the training process (e.g., offline training process, online training process, and the like) below is described using a training image as an example. The description can be suitably adapted to a training block. A training image t of the set of training images can be passed through the encoding process in FIG. 1 to generate a compressed representation (e.g., encoded information, for example, to a bitstream). The encoded information can be passed through the decoding process described in FIG. 1 to compute and reconstruct a reconstructed image $\bar{t}$.

For the NIC framework (100), two competing targets, e.g., a reconstruction quality and a bit consumption are balanced. A quality loss function (e.g., a distortion or distortion loss) D (t, $\bar{t}$) can be used to indicate the reconstruction quality, such as a difference between the reconstruction (e.g., the reconstructed image $\bar{t}$) and an original image (e.g., the training image t). A rate (or a rate loss) R can be used to indicate the bit consumption of the compressed representation. In an example, the rate loss R further includes the side information, for example, used in determining a context model.

For neural image compression, differentiable approximations of quantization can be used in E2E optimization. In various examples, in the training process of neural network-based image compression, noise injection is used to simulate quantization, and thus quantization is simulated by the noise injection instead of being performed by a quantizer (e.g., the quantizer (112)). Thus, training with noise injection can approximate the quantization error variationally. A bits per pixel (BPP) estimator can be used to simulate an entropy coder, and thus entropy coding is simulated by the BPP estimator instead of being performed by an entropy encoder (e.g., (113)) and an entropy decoder (e.g., (114)). Therefore, the rate loss R in the loss function L shown in Eq. 1 during the training process can be estimated, for example, based on the noise injection and the BPP estimator. In general, a higher rate R can allow for a lower distortion D, and a lower rate R can lead to a higher distortion D. Thus, a trade-off hyperparameter λ in Eq. 1 can be used to optimize a joint R-D loss L where L as a summation of λD and R can be optimized. The training process can be used to adjust the parameters of the one or more components (e.g., (111) (115)) in the NIC framework (100) such that the joint R-D loss L is minimized or optimized. In some examples, a trade-off hyperparameter λ can be used to optimize the joint Rate-Distortion (R-D) loss as:

$$L(x,\bar{x},\hat{r}_1, \ldots, \hat{r}_N, \hat{y}) = \lambda D(x,\bar{x}) + R(\Sigma_1^n s_i, \Sigma_1^n u_i) + \beta E \quad \text{Eq. 8}$$

where E measures the distortion of the decoded image residuals compared with the original image residuals before encoding, which acts as regularization loss for the residual encoding/decoding DNNs and the encoding/decoding DNNs. β is a hyperparameter to balance the importance of the regularization loss.

Various models can be used to determine the distortion loss D and the rate loss R, and thus to determine the joint R-D loss L in Eq. 1. In an example, the distortion loss D(t, $\bar{t}$) is expressed as a peak signal-to-noise ratio (PSNR) that is a metric based on mean squared error, a multiscale structural similarity (MS-SSIM) quality index, a weighted combination of the PSNR and MS-SSIM, or the like.

In an example, the target of the training process is to train the encoding neural network (e.g., the encoding DNN), such as a video encoder to be used on an encoder side and the decoding neural network (e.g., the decoding DNN), such as a video decoder to be used on a decoder side. In an example, referring to FIG. 1, the encoding neural network can include the main encoder network (111), the hyper encoder network (121), the hyper decoder network (125), the context model NN (116), and the entropy parameter NN (117). The decoding neural network can include the main decoder network (115), the hyper decoder network (125), the context model NN (116), and the entropy parameter NN (117). The video encoder and/or the video decoder can include other component(s) that are based on NN(s) and/or not based on NN(s).

The NIC framework (e.g., the NIC framework (100)) can be trained in an E2E fashion. In an example, the encoding neural network and the decoding neural network are updated jointly in the training process based on backpropagated gradients in an E2E fashion, for example using a gradient descent algorithm. The gradient descent algorithm can iteratively optimizing parameters of the NIC framework for finding a local minimum of a differentiable function (e.g., a local minimum of a rate distortion loss) of the NIC framework. For example, the gradient descent algorithm can take repeated steps in the opposite direction of the gradient (or approximate gradient) of the differentiable function at the current point.

After the parameters of the neural networks in the NIC framework (100) are trained, one or more components in the NIC framework (100) can be used to encode and/or decode images. In an embodiment, on the encoder side, an image encoder is configured to encode the input image x into the encoded image (131) to be transmitted in a bitstream. The image encoder can include multiple components in the NIC framework (100). In an embodiment, on the decoder side, a corresponding image decoder is configured to decode the encoded image (131) carried in the bitstream into the reconstructed image $\bar{x}$. The image decoder can include multiple components in the NIC framework (100).

It is noted that an image encoder and an image decoder according to an NIC framework can have corresponding structures.

Figure 8:
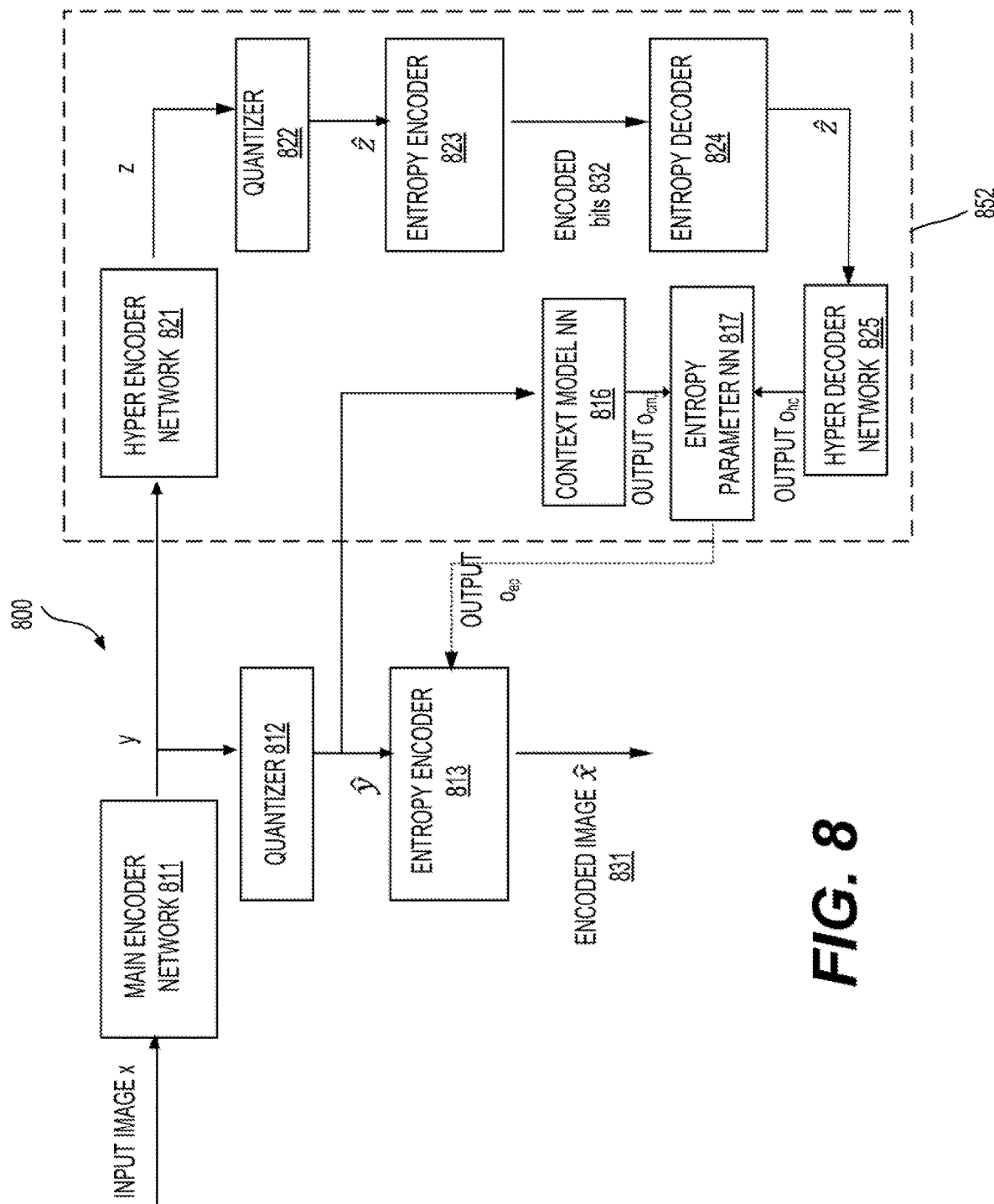
FIG. 8 shows an image encoder in some examples.

FIG. 8 shows an exemplary image encoder (800) according to an embodiment of the disclosure. The image encoder (800) includes a main encoder network (811), a quantizer (812), an entropy encoder (813), and a second sub-NN (852). The main encoder network (811) is similarly configured as the main encoder network (111), the quantizer (812) is similarly configured as the quantizer (112), the entropy encoder (813) is similarly configured as the entropy encoder (113), and the second sub-NN (852) is similarly configured as the second sub-NN (152). The description has been provided above with reference to FIG. 1 and will be omitted herein for clarity.

Figure 9:
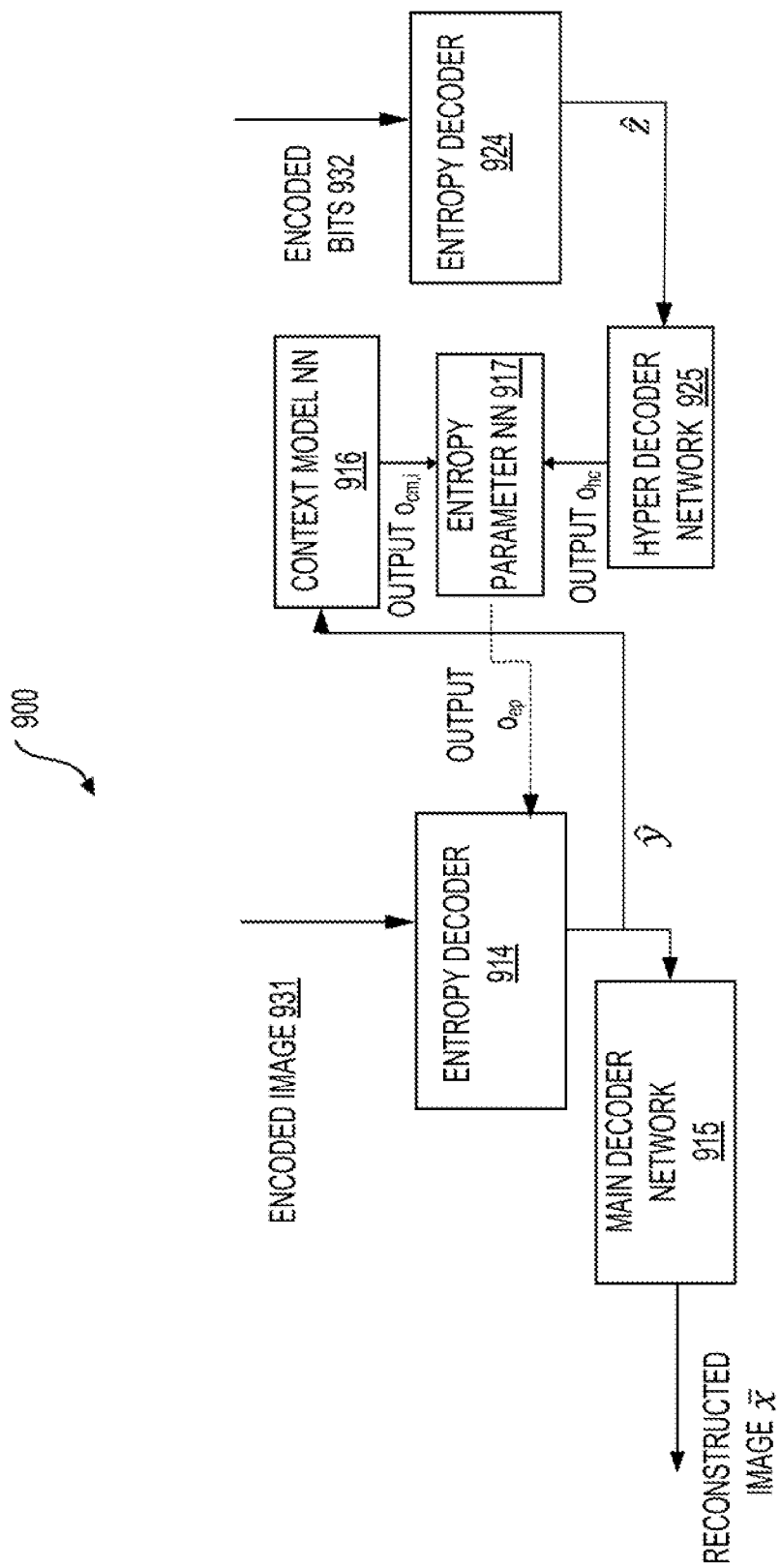
FIG. 9 shows an image decoder in some examples.

FIG. 9 shows an exemplary image decoder (900) according to an embodiment of the disclosure. The image decoder (900) can correspond to the image encoder (800). The image decoder (900) can include a main decoder network (915), an entropy decoder (914), a context model NN (916), an entropy parameter NN (917), an entropy decoder (924), and a hyper decoder network (925). The main decoder network (915) is similarly configured as the main decoder network (115), the entropy decoder (914) is similarly configured as the entropy decoder (114), the context model NN (916) is similarly configured as the context model NN (116), the entropy parameter NN (917) is similarly configured as the entropy parameter NN (117), the entropy decoder (924) is similarly configured as the entropy decoder (124), and the hyper decoder network (925) is similarly configured as the hyper decoder network (125). The description has been provided above with reference to FIG. 1 and will be omitted herein for clarity.

Referring to FIGS. 8-9, on the encoder side, the image encoder (800) can generate an encoded image (831) and encoded bits (832) to be transmitted in the bitstream. On the decoder side, the image decoder (900) can receive and decode an encoded image (931) and encoded bits (932). The encoded image (931) and the encoded bits (932) can be parsed from a received bitstream.

FIGS. 10-11 show an exemplary image encoder (1000) and a corresponding image decoder (1100), respectively, according to embodiments of the disclosure. Referring to FIG. 10, the image encoder (1000) includes the main encoder network (1011), the quantizer (1012), and the entropy encoder (1013). The main encoder network (1011) is similarly configured as the main encoder network (111), the quantizer (1012) is similarly configured as the quantizer (112), and the entropy encoder (1013) is similarly configured as the entropy encoder (113). The description has been provided above with reference to FIG. 1 and will be omitted herein for clarity.

Referring to FIG. 11, the image decoder (1100) includes a main decoder network (1115) and an entropy decoder (1114). The main decoder network (1115) is similarly configured as the main decoder network (115) and the entropy decoder (1114) is similarly configured as the entropy decoder (114). The description has been provided above with reference to FIG. 1 and will be omitted herein for clarity.

Referring to FIGS. 10 and 11, the image encoder (1000) can generate the encoded image (1031) to be included in the bitstream. The image decoder (1100) can receive a bitstream and decode the encoded image (1131) carried in the bitstream.

According to some aspects of the disclosure, image compression can remove redundancy in images, thus a much smaller number of bits can be used to represent the compressed images. Image compression can benefit image transmission and storage. Compressed images can be referred to as images in the compression domain. Image processing on the compressed images can be referred to as image processing in the compression domain. In some examples, image compression can be performed at different compression rates, and the compression domain can be referred to as multi-rate compression domain in some examples.

Computer vision (CV) is a field of artificial intelligence (AI) that uses computer with neural network(s) to detect, understand and process the content of images. The CV tasks can include (but not limited to) image classification, object detection, super resolution (generating a high resolution image from one or more low resolution images), image denoising, and the like. In some related examples, CV tasks are performed on uncompressed images, such as original images without compression, reconstructed images from compressed images, and the like. In some examples, a compressed image is decompressed to generate a reconstructed image, and the CV tasks are performed on the reconstructed image. The reconstruction can be computationally intensive. To perform CV tasks in the compression domain without image reconstruction can reduce computation complexity and reduce latency for the CV tasks.

Some aspects of the disclosure provide techniques for multi-rate computer vision task neural networks in compression domain. In some examples, the techniques can be used in an end-to-end (E2E) optimized framework that includes a model of multi-rate compression domain CV task framework (CDCVTF). The E2E optimized framework includes an encoder and a decoder. The encoder can generate a coded bitstream of an input image, and the decoder decodes the coded bitstream to generate the CV tasks-based results. Both encoder and decoder support multi-rate for the image compression. The end-to-end (E2E) optimized framework can be an artificial neural network (ANN) based framework that is pretrained.

In some examples, CV tasks on compressed images can be performed by two portions of neural networks. In some examples, the two portions of the neural networks form an E2E framework that can be trained end-to-end. The two portions of neural networks include a first portion of an image coding neural network and a second portion of a CV tasks neural network. The image coding neural network is also referred to as an image compression encoder. The CV tasks neural network is also referred to as CV tasks decoder. The image compression encoder can encode an image into a coded bitstream. The CV tasks decoder can decode the coded bitstream to generate the CV task results in the compression domain. The CV tasks decoder performs the CV tasks based on compressed images.

In some examples, an image is compressed by an encoder of an NIC framework to generate a coded bitstream that carries compressed image or compressed features maps. Further, the compressed image or compressed feature maps can be provided to a CV tasks neural network to generate the CV task results.

Figure 12:
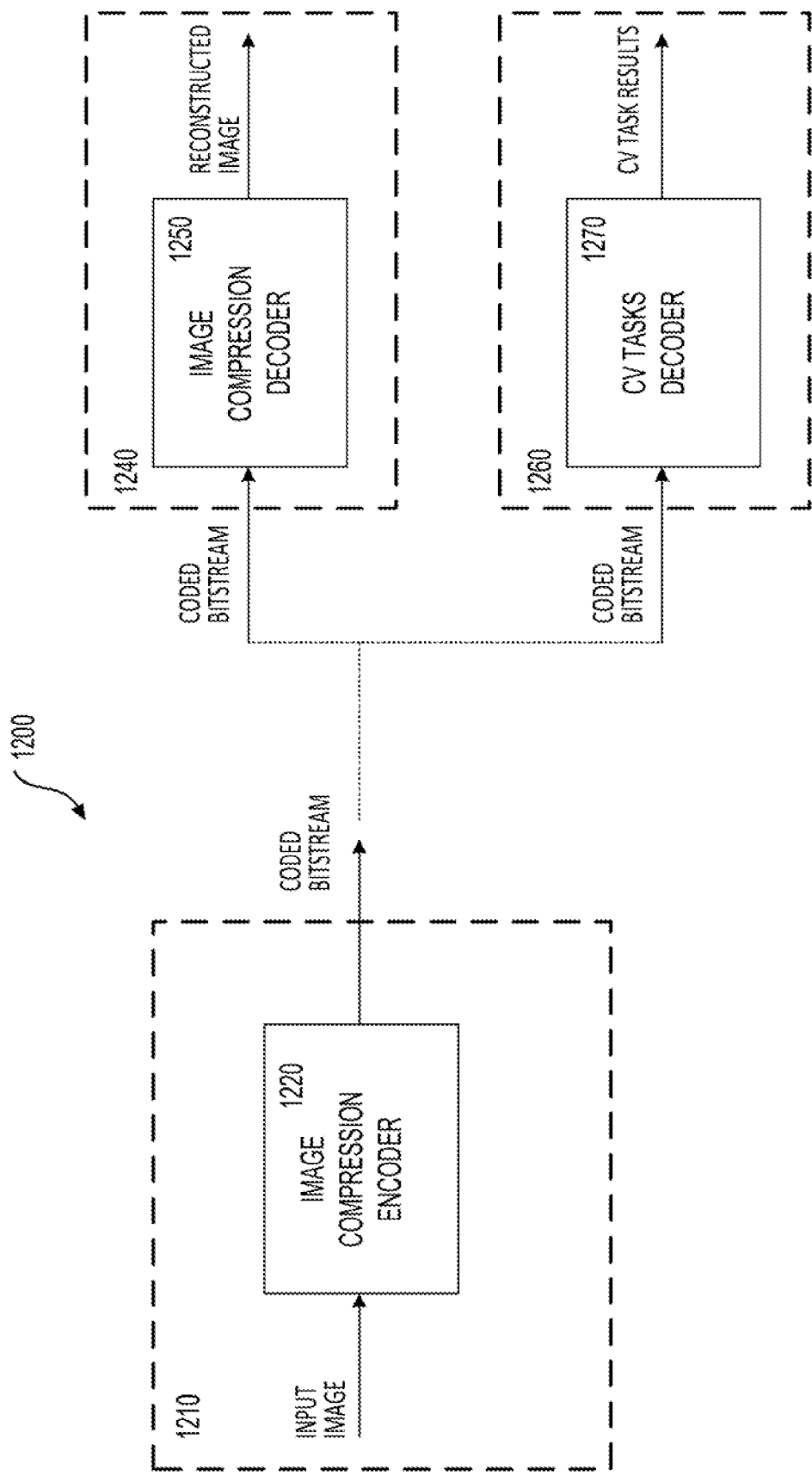
FIG. 12 shows a system for performing computer vision (CV) tasks in the compression domain in some examples.

FIG. 12 shows a system (1200) for performing CV tasks in the compression domain in some examples. The system (1200) includes an image compression encoder (1220), an image compression decoder (1250) and a CV tasks decoder (1270). The image compression decoder (1250) can correspond to the image compression encoder (1220). For example, the image compression encoder (1220) can be configured similarly as the image encoder (800), and the image compression decoder (1250) can be configured similarly as the image decoder (900). In another example, the image compression encoder (1220) can be configured similarly as the image encoder (1000), and the image compression decoder (1250) can be configured similarly as the image decoder (1100). In some examples, the image compression encoder (1220) is configured as an encoding portion (having an encoder model) of a NIC framework, and the image compression decoder (1250) is configured as a decoding portion (having a decoder model) of the NIC framework. The NIC framework can be trained end-to-end to determine pretrained parameters for the encoder model and the decoder model of an E2E optimized framework. The image compression encoder (1220) and the image compression decoder (1250) are configured according to the encoder model and the decoder model having the pretrained parameters. The image compression encoder (1220) can receive an input image, compress the input image and generate a coded bitstream that carries compressed image corresponding to the input image. The image compression decoder (1250) can receive the coded bitstream, decompress the compressed image, and generate a reconstructed image.

The CV tasks decoder (1270) is configured to decode the coded bitstream that carries the compressed image and generate CV task results corresponding to the input image. The CV tasks decoder (1270) can be a single task decoder or can be a multi tasks decoder. The CV tasks can include, but not limited to, super resolution, object detection, image denoising, image classification, and the like.

The CV tasks decoder (1270) includes a neural network (e.g., a CV tasks decoder model) that is trained based on training data. For example, the training data can include training images, compressed training images (e.g., by the image compression encoder (1220)), guideline CV task results of the training images. For example, the CV tasks decoder (1270) can take the compressed training images as input, and generate training CV task results. The CV tasks decoder (1270) (e.g., with tunable neural network structure and tunable parameters) is then trained to minimize a loss between the guideline CV task results and the training CV task results. The training determines structures and pretrained parameters of the CV tasks decoder (1270).

It is noted that the CV task decoder (1270) can have any suitable neural network structures to generate the CV task results. In some embodiments, the CV task decoder (1270) decodes the coded bitstream to generate the CV task results directly without image reconstruction. In some embodiments, the CV task decoder (1270) first decodes the coded bitstream and generates a decompressed image (also referred to as reconstructed image), and then applies a CV task model on the decompressed image to generate the CV task results.

In some examples, the image compression encoder (1220), the image compression decoder (1250) and the CV tasks decoder (1270) are in different electronic devices. For example, the image compression encoder (1220) is in a first device (1210), the image compression decoder (1250) is in a second device (1240), and the CV tasks decoder (1270) is in a third device (1260). In some examples, the image compression decoder (1250) and the CV tasks decoder (1270) can be in a same device. In some examples, the image compression encoder (1220) and the image compression decoder (1250) can be in a same device. In some examples, the image compression encoder (1220), the CV tasks decoder (1270) can be in a same device. In some examples, the image compression encoder (1220), the image compression decoder (1250) and the CV tasks decoder (1270) can be in a same device.

Figure 13:
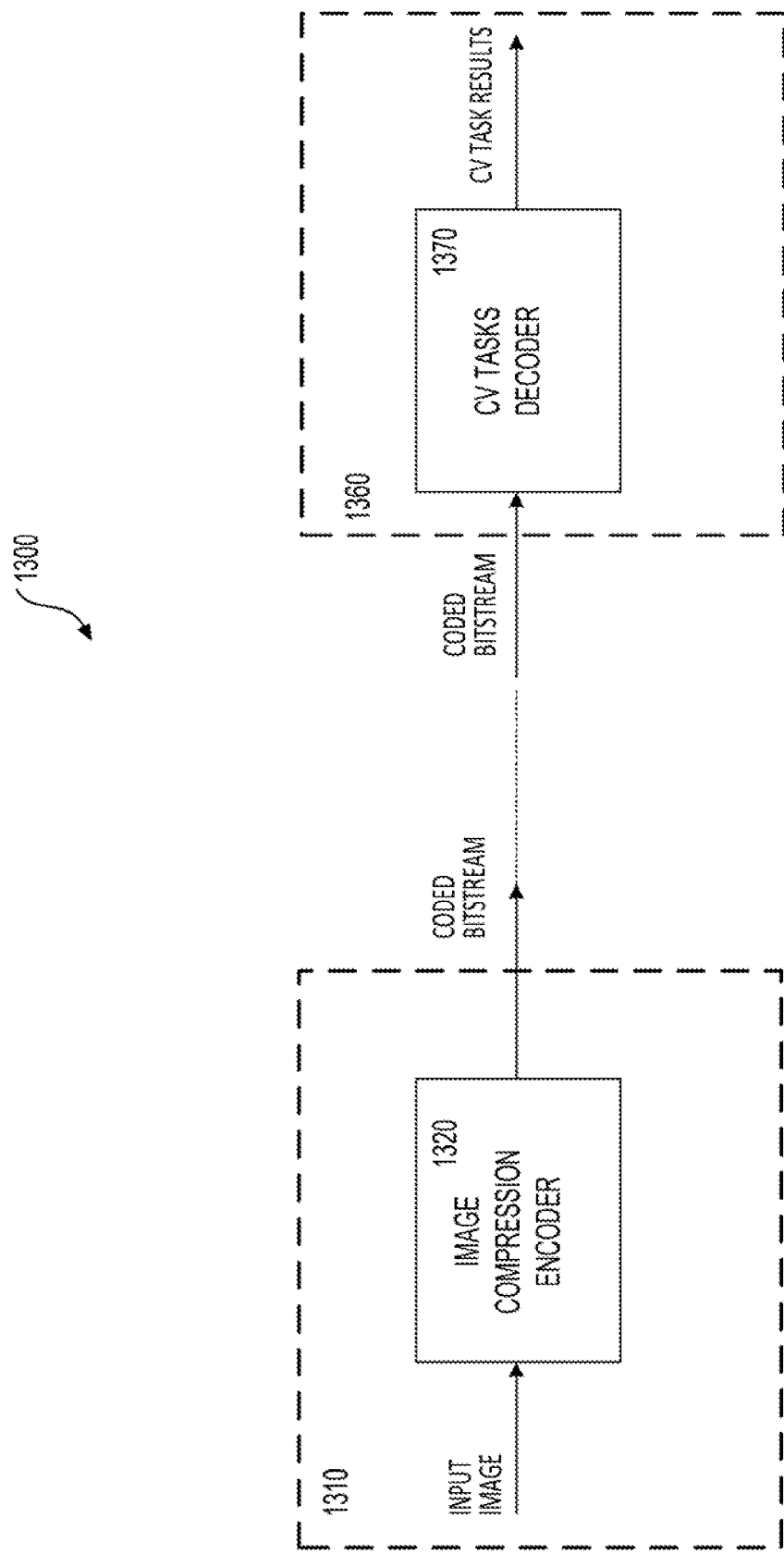
FIG. 13 shows a system for performing CV tasks in the compression domain in some examples.

FIG. 13 shows a system (1300) for performing CV tasks in the compression domain in some examples. The system (1300) includes an image compression encoder (1320) and a CV tasks decoder (1370). In some examples, the image compression encoder (1320) is configured as an encoding portion (having an encoder model) of a NIC framework, and the CV tasks decoder (1370) is configured as a decoding portion (having a decoder model) of the NIC framework. The NIC framework can be trained end-to-end based on training data to determine pretrained parameters for the encoder model and the decoder model of an E2E optimized framework. For example, the training data can include training images (uncompressed), guideline CV task results of the training images. For example, the NIC framework can take the training images as input, and generate training CV task results. The NIC framework is then trained (with tunable neural network structure and tunable parameters) to minimize a loss between the guideline CV task results and the training CV task results. The image compression encoder (1320) and the CV tasks decoder (1370) are configured according to the pretrained parameters.

Then, the image compression encoder (1320) can receive an input image and generate a coded bitstream that carries compressed image or compressed feature maps. The CV tasks decoder (1370) can receive the coded bitstream, decompress the compressed image or the compressed feature maps, and generate the CV task results.

The CV tasks decoder (1370) can be a single task decoder or can be a multi tasks decoder. The CV tasks can include, but not limited to, super resolution, object detection, image denoising, image classification.

It is noted that the CV task decoder (1370) can any suitable neural network structures. In some embodiments, the CV task decoder (1370) decodes the coded bitstream to generate the CV task results directly without image reconstruction. In some embodiments, the CV task decoder (1370) first decodes the coded bitstream and generates a decompressed image (also referred to as reconstructed image), and then applies a CV task model on the decompressed image to generate the CV task results.

In some examples, the image compression encoder (1320) and the CV tasks decoder (1370) are in different electronic devices. For example, the image compression encoder (1320) is in a first device (1310), and the CV tasks decoder (1370) is in a second device (1360). In some examples, the image compression encoder (1320) and the CV tasks decoder (1370) can be in a same device.

According to some aspects of the disclosure, the compression domain in the system (1200) and the system (1300) can be suitably adjusted for multi-rate compression. In some examples, the hyperparameter λ is used to tune the compression rate. In some examples, the compression rate is defined as bits per pixel, and can be calculated according to Eq. 9:

$$\text{Compression rate} = \frac{R}{W \times H} \qquad \text{Eq. 9}$$

where R is the bit consumption in the compressed image and is also used in Eq. 1, W is the width of the input image, and H is the height of the input image. According to Eq. 1 and Eq. 9, when the hyperparameter λ increases, the compression rate also increases.

Some aspects of the disclosure provide neural network model of multi-rate in compression domain CV task framework (CDCVTF). In some examples, the hyperparameter is an input to a CDCVTF, so that the CDCVTF is trained to understand the compression rates, then the value of the hyperparameter λ can be used to tune the compression rate in the model of the CDCVTF. It is noted that the hyperparameter λ is used in the following description to illustrate techniques for multi-rate in CDCVTF, the techniques can be suitably adjusted to use other suitable parameter that can tune the compression rate.

Figure 14:
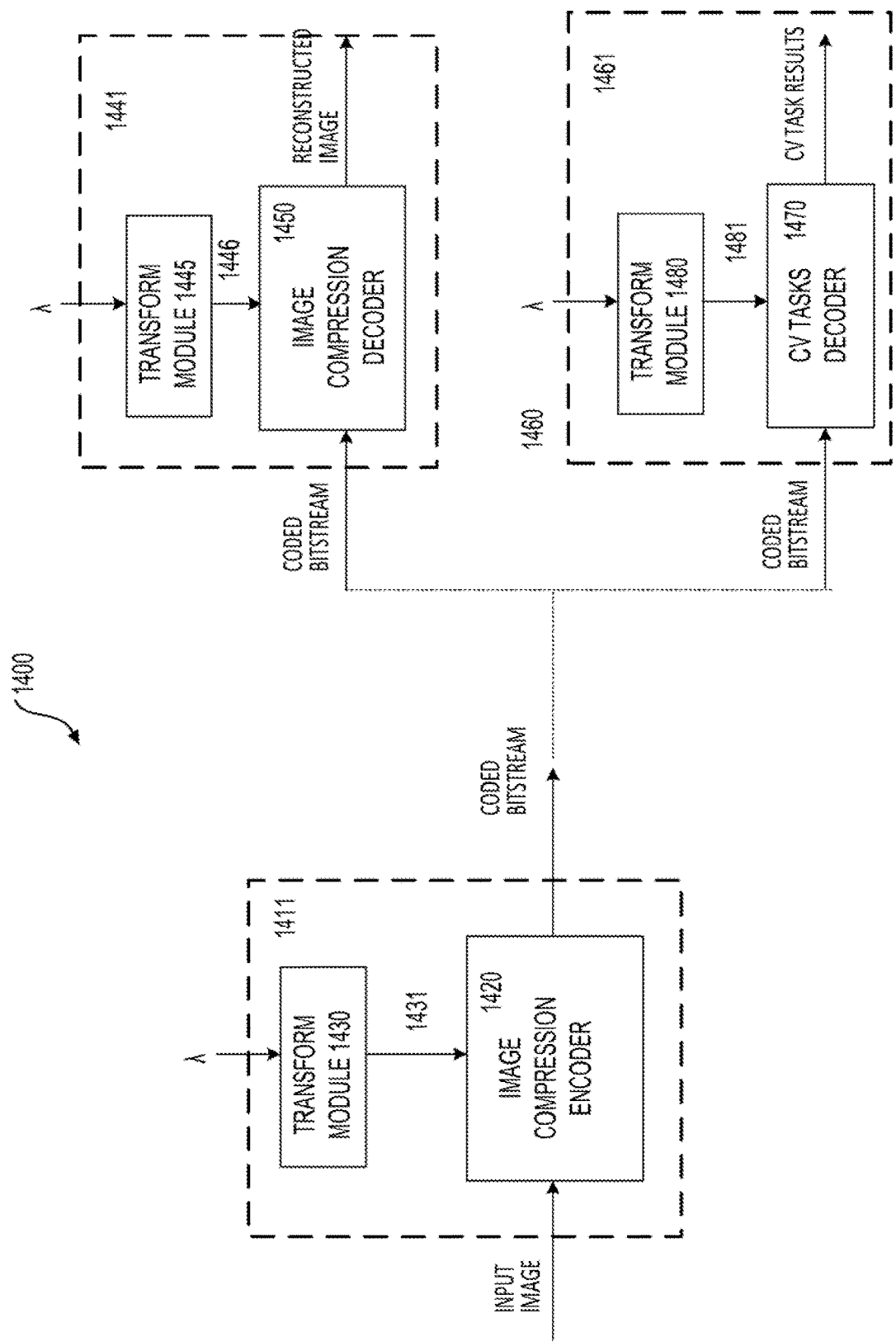
FIG. 14 shows a system for performing CV tasks in the multi-rate compression domain in some examples.

FIG. 14 shows a system (1400) for performing CV tasks in the multi-rate compression domain in some examples. The system (1400) includes a multi-rate image compression encoder (1411), a multi-rate image compression decoder (1441) and a multi-rate CV tasks decoder (1461). In some examples, the multi-rate image compression decoder (1441) can correspond to the multi-rate image compression encoder (1411). In some examples, the multi-rate image compression encoder (1411) is configured as an encoding portion (having an encoder model) of a multi-rate NIC framework, and the multi-rate image compression decoder (1441) is configured as a decoding portion (having a decoder model) of the multi-rate NIC framework. The multi-rate NIC framework can be trained end-to-end (e.g., an E2E multi-rate NIC training) to determine pretrained parameters for the encoder model and the decoder model of an E2E optimized framework for multi-rate image compression.

In the FIG. 14 example, the multi-rate image compression encoder (1411) includes a transform module (1430) and an image compression encoder (1420). The transform module (1430) includes a neural network that converts the hyperparameter λ to a tensor (1431). The image compression encoder (1420) can compress an input image based on the tensor (1431) to generate a coded bitstream that carries a compressed image corresponding to the input image. In some examples, the neural network in the transform module (1430) includes tunable structure or tunable parameters that can be tuned during the E2E multi-rate NIC training to determine pretrained parameters.

In the FIG. 14 example, the multi-rate image compression decoder (1441) includes a transform module (1445) and an image compression decoder (1450). The transform module (1445) includes a neural network that converts the hyperparameter λ to a tensor (1446). The image compression decoder (1450) can decompress the compressed image based on the tensor (1446) to generate a reconstructed image. In some examples, the neural network in the transform module (1445) includes tunable structure or tunable parameters that can be tuned during the E2E multi-rate NIC training to determine pretrained parameters.

In the FIG. 14 example, the multi-rate CV tasks decoder (1461) includes a transform module (1480) and a CV tasks decoder (1470). The transform module (1480) includes a neural network that converts the hyperparameter λ to a tensor (1481). The CV tasks decoder (1470) can decode the compressed image based on the tensor (1481) to generate CV task results. In some examples, the neural network in the transform module (1480) includes tunable structure or tunable parameters that can be tuned during a training (referred to as CV tasks training) to determine pretrained parameters.

The multi-rate CV tasks decoder (1461) can be a single task decoder or can be a multi tasks decoder. The CV tasks can include, but not limited to, super resolution, object detection, image denoising, image classification.

The multi-rate CV tasks decoder (1461) can be trained in the CV tasks training based on training data. For example, the training data can include training images, compressed training images with corresponding rates (e.g., based on the multi-rate image compression decoder (1441)), guideline CV task results of the training images. For example, the multi-rate CV tasks decoder (1461) can take the compressed training images with corresponding rates as input, and generate training CV task results. The multi-rate CV tasks decoder (1461) is then trained (with tunable neural network structure and tunable parameters) to minimize a loss between the guideline CV task results and the training CV task results.

In some embodiments, the multi-rate CV tasks decoder (1461) decodes the coded bitstream to generate the CV task results directly without image reconstruction. In some embodiments, the multi-rate CV tasks decoder (1461) first decodes the coded bitstream and generates a decompressed image, and then applies a CV task model on the decompressed image to generate the CV task results.

In some examples, the multi-rate image compression encoder (1411), the multi-rate image compression decoder (1441) and the multi-rate CV tasks decoder (1461) are in different electronic devices. For example, the multi-rate image compression encoder (1411) is in a first device, the multi-rate image compression decoder (1441) is in a second device, and the multi-rate CV tasks decoder (1461) is in a third device. In some examples, the multi-rate image compression decoder (1441) and the multi-rate CV tasks decoder (1461) can be in a same device. In some examples, the multi-rate image compression encoder (1411) and the multi-rate image compression decoder (1441) can be in a same device. In some examples, the multi-rate image compression encoder (1411), the multi-rate CV tasks decoder (1461) can be in a same device. In some examples, the multi-rate image compression encoder (1411), the multi-rate image compression decoder (1441) and the multi-rate CV tasks decoder (1461) can be in a same device.

In some examples, the transform module (1430), the transform module (1445) and the transform module (1480) can have a same neural network structure and same pretrained parameters. In some examples, the transform module (1430), the transform module (1445) and the transform module (1480) can have a same neural network structure but different pretrained parameters. In some examples, the transform module (1430), the transform module (1445) and the transform module (1480) can have different neural network structures.

It is noted that the tensors generated according to the values of the hyperparameter $\lambda$ can be provided to any suitable layers in a neural network. For example, the tensor (1481) that is generated according to a value of the hyperparameter $\lambda$ can be provided to one or more layers in the neural network of the CV tasks decoder (1470).

Figure 15:
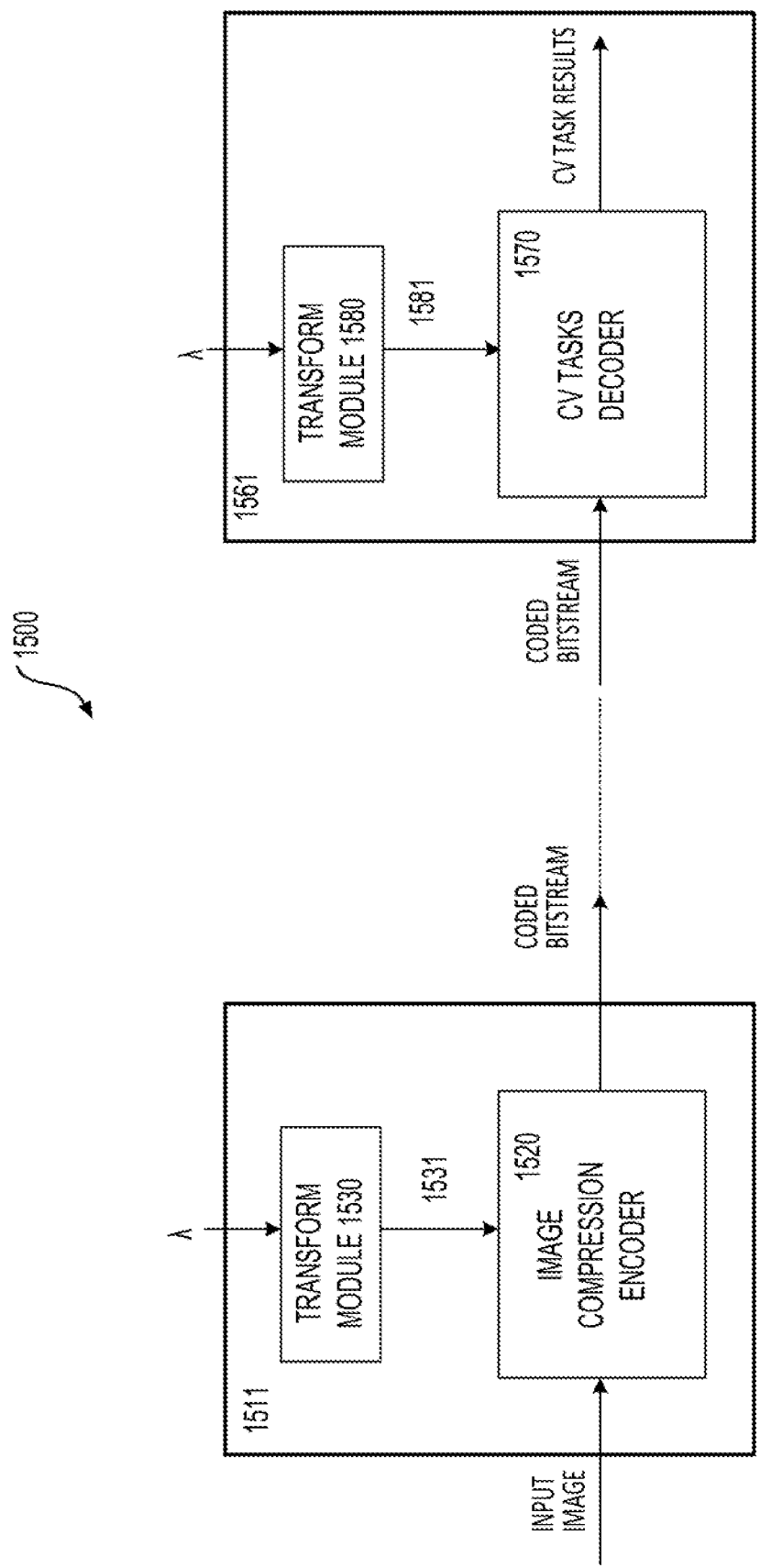
FIG. 15 shows a system for performing CV tasks in the multi-rate compression domain in some examples.

FIG. 15 shows a system (1500) for performing CV tasks in the multi-rate compression domain in some examples. The system (1500) includes a multi-rate image compression encoder (1511) and a multi-rate CV tasks decoder (1561). In some examples, the multi-rate image compression encoder (1611) is configured as an encoding portion (having an encoder model) of a multi-rate NIC framework, and the multi-rate CV tasks decoder (1561) is configured as a decoding portion (having a decoder model) of the multi-rate NIC framework. The multi-rate NIC framework can be trained end-to-end (e.g., an E2E multi-rate NIC training) to determine pretrained parameters for the encoder model and the decoder model of an E2E optimized framework for multi-rate CV tasks.

In the FIG. 15 example, the multi-rate image compression encoder (1511) includes a transform module (1530) and an image compression encoder (1520). The transform module (1530) includes a neural network that converts the hyperparameter $\lambda$ to a tensor (1531). The image compression encoder (1520) can compress an input image based on the tensor (1531) to generate a coded bitstream that carries a compressed image or compressed feature maps corresponding to the input image. In some examples, the neural network in the transform module (1530) includes tunable structure or tunable parameters that can be tuned during the E2E multi-rate NIC training to determine pretrained parameters.

In the FIG. 15 example, the multi-rate CV tasks decoder (1561) includes a transform module (1580) and a CV tasks decoder (1570). The transform module (1580) includes a neural network that converts the hyperparameter $\lambda$ to a tensor (1581). The CV tasks decoder (1570) can decode the compressed image or compressed feature maps based on the tensor (1581) to generate CV task results. In some examples, the neural network in the transform module (1580) includes tunable structure or tunable parameters that can be tuned during the E2E multi-rate NIC training to determine pretrained parameters.

The multi-rate CV tasks decoder (1561) can be a single task decoder or can be a multi tasks decoder. The CV tasks can include, but not limited to, super resolution, object detection, image denoising, image classification.

The multi-rate CV tasks decoder (1561) can be trained with the multi-rate image compression encoder (1511) in the E2E multi-rate NIC training based on training data. For example, the training data can include training images, values of the hyperparameter $\lambda$, guideline CV task results of the training images. For example, the multi-rate image compressing encoder (1511) can take a training image with a value of the hyperparameter $\lambda$ as input to generate compressed feature maps, and the compressed feature maps and the value of the hyperparameter X, can be input to the multi-rate CV tasks decoder (1561) to generate training CV task results corresponding to the training image and the value of the hyperparameter $\lambda$. The multi-rate CV tasks decoder (1561) and the multi-rate image compression encoder (1511) are trained (with tunable neural network structure and tunable parameters) to minimize a loss between the guideline CV task results and the training CV task results.

In some embodiments, the multi-rate CV tasks decoder (1561) decodes the coded bitstream to generate the CV task results directly without image reconstruction. In some embodiments, the multi-rate CV tasks decoder (1561) first decodes the coded bitstream and generates a decompressed image, and then applies a CV task model on the decompressed image to generate the CV task results.

In some examples, the multi-rate image compression encoder (1511) and the multi-rate CV tasks decoder (1561) are in different electronic devices. In some examples, the multi-rate image compression encoder (1511) and the multi-rate CV tasks decoder (1561) are in a same electronic device.

In some examples, the transform module (1530), and the transform module (1580) can have a same neural network structure and same pretrained parameters. In some examples, the transform module (1530), and the transform module (1580) can have a same neural network structure but different pretrained parameters. In some examples, the transform module (1530) and the transform module (1580) can have different neural network structures.

It is noted that the tensors generated by the transform modules according to the values of the hyperparameter $\lambda$ can be provided to any suitable layers in a neural network. For example, the tensor (1581) that is generated according to a value of the hyperparameter $\lambda$ can be provided to one or more layers in the neural network of the CV tasks decoder (1570).

In some examples, the value of the parameters that controls the compression rate is signaled in the coded bitstream that carries the compressed image or compressed feature maps. For example, the value of the hyperparameter λ is signaled in the coded bitstream from the encoder side, such as the multi-rate image compression encoder (1411), the multi-rate image compression encoder (1511) and the like. Then, a CV tasks decoder, such as the multi-rate CV tasks decoder (1461), the multi-rate CV tasks decoder (1561) and the like, can receive the hyperparameter λ information.

It is noted that the network architectures, such as the neural network structures of image compression encoder, CV tasks decoder, and transform modules can have any suitable structures. In an embodiment, a transform module includes a set of convolutional layers. In another embodiment, a transform module includes a convolutional layer with an activation function.

In some embodiments, the hyperparameter λ is chosen from a set of pre-defined values that are known by both the encoder side and the decoder side. For the selected λ value at the encoder side, the index of the value in the set is signaled in the coded bitstream. According to the index, the decoder can determine the value of the hyperparameter λ that is used in the encoding, and can use the same value of the hyperparameter λ as input to the decoder network.

In an example, 8 values of the hyperparameter λ are predefined and are placed in a set. Both the encoder side and the decoder side have the information of the set, such as the 8 values and the positions of the 8 values in the set. Then, instead of transmitting the selected value of the hyperparameter λ at the encoder side, an index that indicates the selected value in the set can be transmitted from the encoder side to the decoder set. For example, the index can be 0 to 7. According to the index, the decoder can determine the selected value of the hyperparameter λ at the encoder side.

According to an aspect of the disclosure, comparing to regular CDCVTF, the multi-rate CDCVTF includes multi-rate function, and a parameter, such as the hyperparameter λ is the input of the multi-rate CDCVTF. The value of the parameter, such as the value of the hyperparameter λ can be changed to tune the image compression rate.

Figure 16:
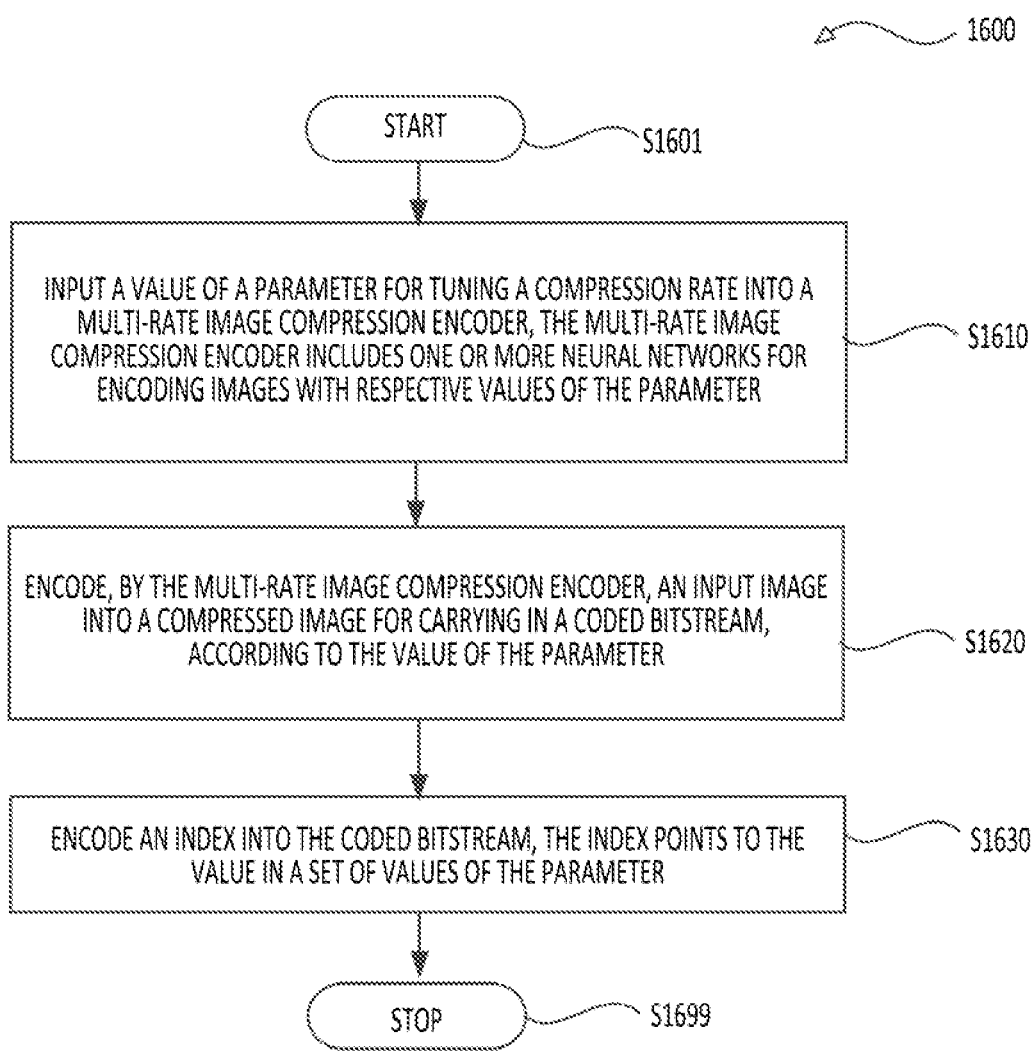
FIG. 16 shows a flow chart outlining a process in some examples.

FIG. 16 shows a flow chart outlining a process (1600) according to an embodiment of the disclosure. The process (1600) is an encoding process. The process (1600) can be executed in an electronic device. In some embodiments, the process (1600) is implemented in software instructions, thus when the processing circuitry executes the software instructions, the processing circuitry performs the process (1600). The process starts at (S1601), and proceeds to (S1610).

At (S1610), a value of a parameter for tuning a compression rate is input into a multi-rate image compression encoder, such as the multi-rate image compression encoder (1411), the multi-rate image compression encoder (1511), and the like. The multi-rate image compression encoder includes one or more neural networks for encoding images with respective values of the parameter.

At (S1620), the multi-rate image compression encoder encodes an input image into a compressed image for carrying in a coded bitstream, according to the value of the parameter. The value of the parameter tunes the compression rate for encoding the input image into the compressed image.

At (S1630), an index is encoded into the coded bitstream, the index points to the value in a set of values (e.g., predefined values) of the parameter.

Then, the process (1600) proceeds to (S1699) and terminates.

The process (1600) can be suitably adapted to various scenarios and steps in the process (1600) can be adjusted accordingly. One or more of the steps in the process (1600) can be adapted, omitted, repeated, and/or combined. Any suitable order can be used to implement the process (1600). Additional step(s) can be added.

Figure 17:
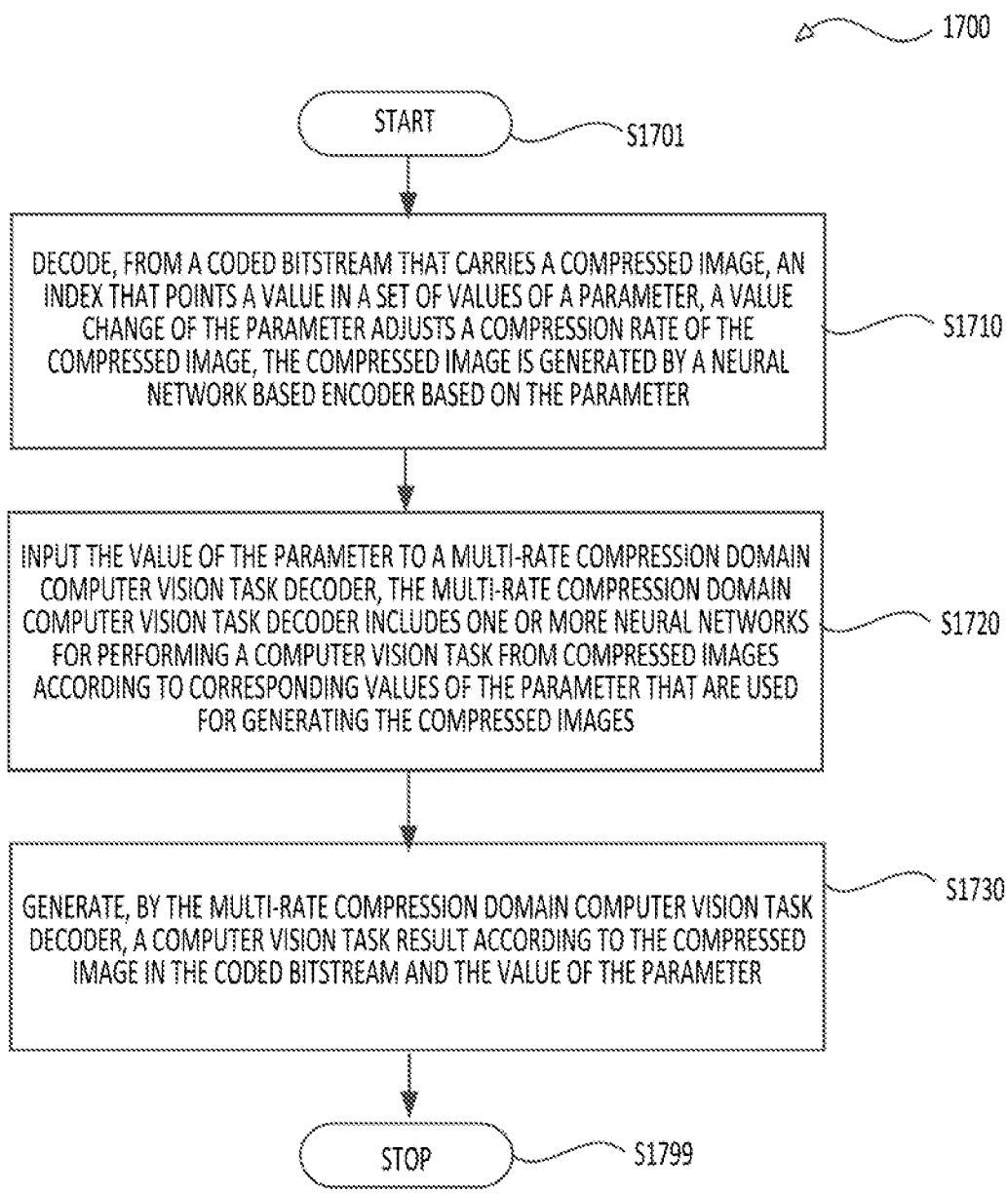
FIG. 17 shows a flow chart outlining a process in some examples.

FIG. 17 shows a flow chart outlining a process (1700) according to an embodiment of the disclosure. The process (1700) is a decoding process. The process (1700) can be executed in an electronic device. In some embodiments, the process (1700) is implemented in software instructions, thus when the processing circuitry executes the software instructions, the processing circuitry performs the process (1700). The process starts at (S1701), and proceeds to (S1710).

At (S1710), from a coded bitstream that carries a compressed image, an index that points a value in a set of values of a parameter is decoded. A value change of the parameter adjusts a compression rate of the compressed image. The compressed image is generated by a neural network based encoder, such as the multi-rate image compression encoder (1411), the multi-rate image compression encoder (1511), and the like, according to the value of the parameter.

At (S1720), the value of the parameter is input into a multi-rate compression domain computer vision task decoder, such as the multi-rate CV tasks decoder (1461), the multi-rate CV tasks decoder (1561), and the like. The multi-rate compression domain computer vision task decoder includes one or more neural networks for performing a computer vision task from compressed images according to corresponding values of the parameter that are used for generating the compressed images.

At (S1730), the multi-rate compression domain computer vision task decoder generates a computer vision task result according to the compressed image in the coded bitstream and the value of the parameter.

In some examples, a first neural network (e.g., the transform model (1480), the transform model (1580)) in the multi-rate compression domain computer vision task decoder converts the value of the parameter to a tensor. The tensor is input to one or more layers in a second neural network (e.g., the CV tasks decoder (1470), the CV tasks decoder (1570)) in the multi-rate compression domain computer vision task decoder. The second neural network generates the computer vision task result according to the compressed image and the tensor.

In some examples, the first neural network includes one or more convolution layers. In some examples, the first neural network includes a convolution layer with an activation function.

In some examples, the second neural network is configured to generate the computer vision task result without generating a reconstructed image from the compressed image.

In some examples, the second neural network is configured to generate a reconstructed image from the compressed image, and generate the computer vision task result from the reconstructed image.

In some examples, the neural network based encoder is based on an encoder model in a neural image compression (NIC) framework, and the multi-rate compression domain computer vision task decoder is based on a decoder model in the NIC framework, the NIC framework is trained end-to-end, such as described with reference to FIG. 15.

In some examples, a decoder model of the multi-rate compression domain computer vision task decoder is trained separate from an encoder model of the neural network based encoder, such as described with reference to FIG. 14.

In some examples, the parameter is a hyperparameter for weighting a distortion in a calculation of a rate distortion loss, such as the hyperparameter λ in Eq. 1.

It is noted that the computer vision task can be any suitable computer vision task, such as image classification, image denoising, object detection, super resolution, and the like.

Then, the process (1700) proceeds to (S1799) and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
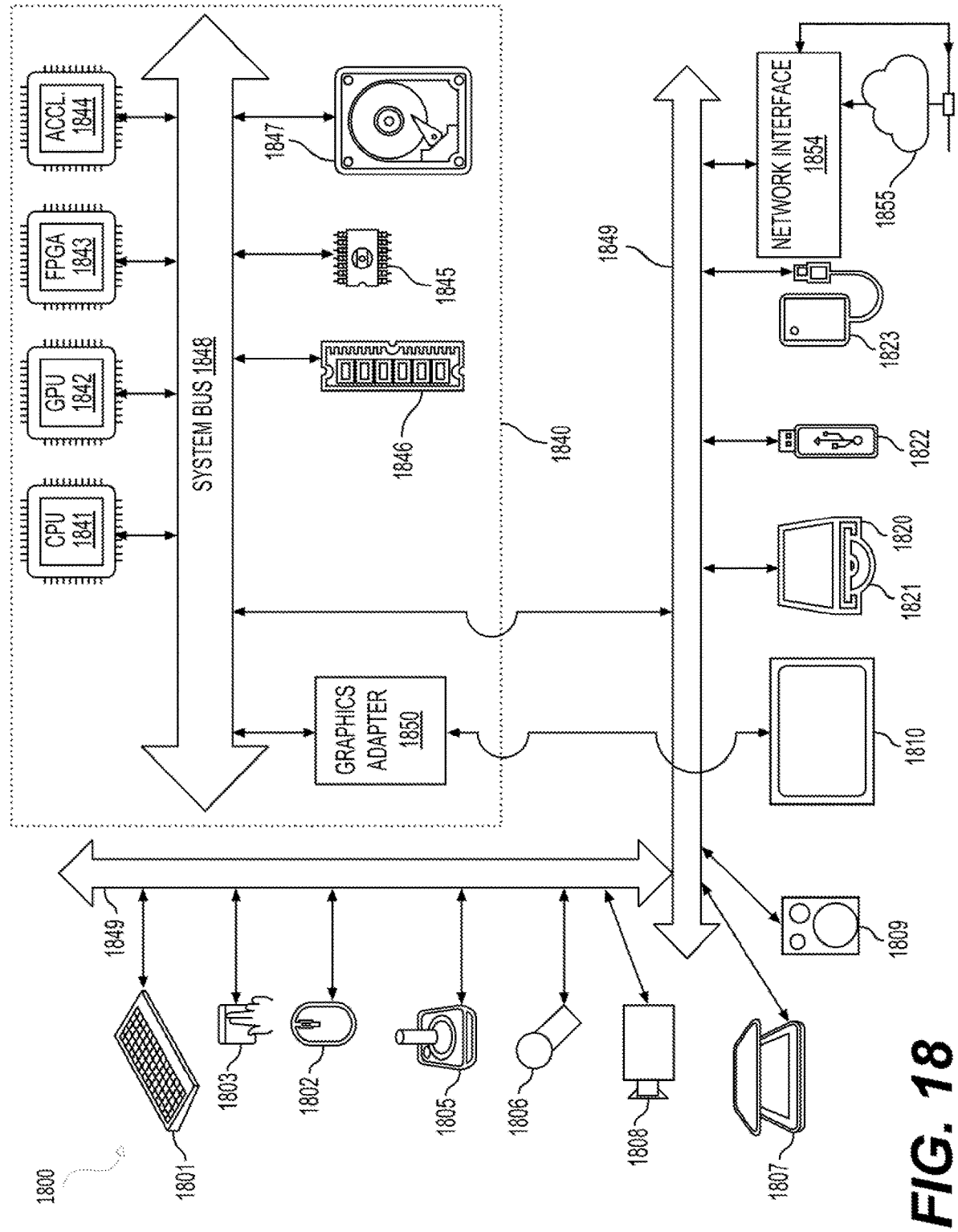
FIG. 18 is a schematic illustration of a computer system in some examples.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for image processing, comprising:
    decoding, from a coded bitstream that carries a compressed image, an index that points to a value in a set of values of a parameter, a value change of the parameter adjusting a compression rate of the compressed image, the compressed image being generated by a neural network based encoder based on the parameter, the parameter weighting a distortion and a rate in a calculation of a rate-distortion (R-D) loss;
    inputting the value of the parameter to a multi-rate compression domain computer vision task decoder in a compression domain computer vision task framework (CDCVTF), the multi-rate compression domain computer vision task decoder comprising one or more neural networks for performing a computer vision task from compressed images according to corresponding values of the parameter that are used for generating the compressed images at multiple different compression rates; and
    generating, by the multi-rate compression domain computer vision task decoder, a computer vision task result according to the compressed image in the coded bitstream which is compressed at a corresponding compression rate from the multiple different compression rates, the compression rate being based on the value of the parameter, wherein
    the generating the computer vision task result includes:
        converting, by a first neural network in the multi-rate compression domain computer vision task decoder, the value of the parameter to a tensor;
        inputting the tensor to one or more layers in a second neural network in the multi-rate compression domain computer vision task decoder; and
        generating, by the second neural network, the computer vision task result according to the compressed image and the tensor.

2. The method of claim 1, wherein the first neural network comprises one or more convolution layers.

3. The method of claim 1, wherein the first neural network comprises a convolution layer with an activation function.

4. The method of claim 1, wherein the second neural network is configured to generate the computer vision task result without generating a reconstructed image from the compressed image.

5. The method of claim 1, wherein the second neural network is configured to generate a reconstructed image from the compressed image and generate the computer vision task result from the reconstructed image.

6. The method of claim 1, wherein the neural network based encoder is based on an encoder model in a neural image compression (NIC) framework, and the multi-rate compression domain computer vision task decoder is based on a decoder model in the NIC framework, the NIC framework is trained end-to-end.

7. The method of claim 1, wherein a decoder model of the multi-rate compression domain computer vision task decoder is trained separately from an encoder model of the neural network based encoder.

8. The method of claim 1, wherein the parameter is a hyperparameter.

9. The method of claim 1, wherein the computer vision task comprises at least one of image classification, image denoising, object detection and super resolution.

10. An apparatus for image processing, comprising processing circuitry configured to:
input a value of a parameter to a multi-rate image compression encoder, the multi-rate image compression encoder comprising one or more neural networks for encoding images according to a set of values of the parameter that are used for generating compressed images at multiple different compression rates, a value change of the parameter adjusting a compression rate of a respective compressed image, the parameter weighting a distortion and a rate in a calculation of a rate-distortion (R-D) loss;
encode, by the multi-rate image compression encoder, an input image into a compressed image according to a corresponding compression rate from the multiple different compression rates, the compression rate being based on the value of the parameter; and
encode an index that points to the value in the set of values of the parameter, wherein
the value of the parameter is converted to a tensor by a first neural network in the multi-rate image compression encoder;
the tensor is input to one or more layers in a second neural network in the multi-rate image compression encoder; and
the compressed image is encoded by the second neural network according to the input image and the tensor.

11. The apparatus of claim 10, wherein the first neural network comprises one or more convolution layers.

12. The apparatus of claim 10, wherein the first neural network comprises a convolution layer with an activation function.

13. The apparatus of claim 10, wherein the multi-rate image compression encoder is based on an encoder model in a neural image compression (NIC) framework, and a multi-rate compression domain computer vision task decoder that corresponds to the multi-rate image compression encoder is based on a decoder model in the NIC framework, the NIC framework is trained end-to-end.

14. The apparatus of claim 13, wherein the decoder model of the multi-rate compression domain computer vision task decoder is trained separately from the encoder model of the multi-rate image compression encoder.

15. The apparatus of claim 10, wherein the parameter is a hyperparameter.

16. A method of processing visual media data, the method comprising:
processing a bitstream of the visual media data according to a format rule, wherein
the bitstream includes a syntax element indicating an index that points to a value in a set of values of a parameter, a value change of the parameter adjusting a compression rate of a compressed image in the bitstream, the compressed image being generated based on the parameter, the parameter weighting a distortion and a rate in a calculation of a rate-distortion (R-D) loss; and
the format rule specifies that:
the value of the parameter is input to a multi-rate compression domain computer vision task decoder in a compression domain computer vision task framework (CDCVTF), the multi-rate compression domain computer vision task decoder comprising one or more neural networks for performing a computer vision task from compressed images according to corresponding values of the parameter that are used for generating the compressed images at multiple different compression rates;
the value of the parameter is converted to a tensor by a first neural network in the multi-rate compression domain computer vision task decoder;
the tensor is input to one or more layers in a second neural network in the multi-rate compression domain computer vision task decoder; and
a computer vision task result is generated by the second neural network according to the compressed image and the tensor, the compressed image in the bitstream being compressed at a corresponding compression rate from the multiple different compression rates, the compression rate being based on the value of the parameter.

\* \* \* \* \*